United States Patent
Goswami

(10) Patent No.: US 11,082,754 B2
(45) Date of Patent: Aug. 3, 2021

(54) METHOD AND SYSTEM TO GENERATE ONE OR MORE MULTI-DIMENSIONAL VIDEOS

(71) Applicant: SONY CORPORATION, Tokyo (JP)

(72) Inventor: Nabarun Goswami, Bangalore (IN)

(73) Assignee: SONY CORPORATION, Tokyo (JP)

( * ) Notice: Subject to any disclaimer, the term of this patent is extended or adjusted under 35 U.S.C. 154(b) by 421 days.

(21) Appl. No.: 15/240,563

(22) Filed: Aug. 18, 2016

(65) Prior Publication Data
US 2018/0054659 A1 Feb. 22, 2018

(51) Int. Cl.
| | | |
|---|---|---|
| H04N 21/81 | (2011.01) | |
| H04N 21/8549 | (2011.01) | |
| H04N 13/194 | (2018.01) | |
| H04N 21/218 | (2011.01) | |
| H04N 21/2187 | (2011.01) | |
| H04N 13/243 | (2018.01) | |

(52) U.S. Cl.
CPC ......... *H04N 21/816* (2013.01); *H04N 13/194* (2018.05); *H04N 13/243* (2018.05); *H04N 21/2187* (2013.01); *H04N 21/21805* (2013.01); *H04N 21/8133* (2013.01); *H04N 21/8549* (2013.01)

(58) Field of Classification Search
CPC .......... H04N 21/816; H04N 21/21805; H04N 21/2187; H04N 13/194; H04N 21/8133; H04N 21/8549
See application file for complete search history.

(56) References Cited

U.S. PATENT DOCUMENTS

| | | | |
|---|---|---|---|
| 8,136,133 B2 | 3/2012 | Walker et al. | |
| 2003/0025800 A1* | 2/2003 | Hunter | H04N 7/181 348/208.13 |
| 2009/0059007 A1* | 3/2009 | Wagg | G06K 9/00369 348/157 |

(Continued)

OTHER PUBLICATIONS

Brandon Costa, "The Next Big Thing? How Replay Technologies' Freed System Is Taking Sports TV by Storm", Oct. 11, 2013, pp. 7 Available at: http://www.sportsvideo.org/2013/10/11/the-next-big-thing-how-replay-technologies-freed-system-is-taking-sports-tv-by-storm/.

*Primary Examiner* — Joseph G Ustaris
*Assistant Examiner* — Jill D Sechser
(74) *Attorney, Agent, or Firm* — Chip Law Group

(57) ABSTRACT

Various aspects of a system and method to generate a multi-dimensional video are disclosed herein. In accordance with an embodiment, the system includes an application server, which receives a plurality of videos feeds from a plurality of image-capturing devices that capture a pre-defined area. Further, sensor data is received from a plurality of sensors associated with one or more subjects in the pre-defined area. Thereafter, a location-of-occurrence of an upcoming activity-of-interest is predicted in the predefined area based on the received plurality of video feeds, sensor data, and/or pre-stored statistical data of the historical performance of the one or more subjects. One or more control instructions are communicated to one or more of the plurality of image-capturing devices to focus towards the predicted location-of-occurrence to enable the generation of the multi-dimensional video. Thereafter, one or more views of the generated multi-dimensional video are broadcasted to a plurality of subscriber-terminals.

23 Claims, 10 Drawing Sheets

(56) References Cited

U.S. PATENT DOCUMENTS

| | | | |
|---|---|---|---|
| 2009/0262193 A1* | 10/2009 | Anderson | H04N 5/222 348/157 |
| 2009/0284601 A1* | 11/2009 | Eledath | G06K 9/209 348/157 |
| 2010/0026809 A1* | 2/2010 | Curry | H04N 5/222 348/157 |
| 2010/0123830 A1* | 5/2010 | Vunic | H04N 21/4394 348/700 |
| 2010/0134614 A1* | 6/2010 | Aman | A63B 24/0003 348/135 |
| 2011/0267461 A1* | 11/2011 | Birenboim | G06T 7/292 348/142 |
| 2012/0176503 A1* | 7/2012 | You | H04N 1/00411 348/220.1 |
| 2013/0041590 A1* | 2/2013 | Burich | A61B 5/1118 702/19 |
| 2013/0148861 A1 | 6/2013 | Ferlatte et al. | |
| 2014/0074263 A1* | 3/2014 | Balakrishnan | A63B 71/0686 700/91 |
| 2014/0080638 A1* | 3/2014 | Feng | A63B 69/002 473/439 |
| 2014/0146177 A1* | 5/2014 | Pacor | H04N 21/6543 348/157 |
| 2014/0364974 A1* | 12/2014 | Wohl | G06K 7/10227 700/91 |
| 2014/0365415 A1* | 12/2014 | Stelfox | H04B 1/719 706/21 |
| 2015/0131845 A1* | 5/2015 | Forouhar | G06K 9/00724 382/100 |
| 2015/0248917 A1* | 9/2015 | Chang | H04N 21/8549 386/282 |
| 2015/0347918 A1* | 12/2015 | Lucey | G06N 5/048 706/12 |
| 2015/0382076 A1* | 12/2015 | Davisson | H04H 20/04 725/62 |
| 2016/0096068 A1* | 4/2016 | DeAngelis | A63B 24/0021 |
| 2016/0158625 A1* | 6/2016 | DeAngelis | A63B 71/0619 340/539.13 |
| 2016/0260015 A1* | 9/2016 | Lucey | G06N 5/022 |
| 2016/0331316 A1* | 11/2016 | Allen | A61B 5/6803 |
| 2017/0165570 A1* | 6/2017 | Lucey | A63F 13/216 |
| 2017/0287215 A1* | 10/2017 | Lalonde | G02B 27/017 |
| 2018/0056187 A1* | 3/2018 | Ahn | A63F 13/52 |
| 2018/0137364 A1* | 5/2018 | Forouhar | G06K 9/00724 |

* cited by examiner

METHOD AND SYSTEM TO GENERATE ONE OR MORE MULTI-DIMENSIONAL VIDEOS

CROSS-REFERENCE TO RELATED APPLICATIONS/INCORPORATION BY REFERENCE

None.

FIELD

Various embodiments of the disclosure relate to image or video capture. More specifically, various embodiments of the disclosure relate to generation of one or more multi-dimensional videos.

BACKGROUND

With the advancements in computing technology in recent years, interest in sports statistics have grown at a staggering rate. Each action performed by each player in every match may be recorded and used as a statistic to rate that player with respect to the other players of the same sport. Advancements in image processing techniques result in higher quality videos. However, the generation of such high quality videos or multi-field of view (FOV) videos may be a difficult task or a time consuming process. Currently, a scene may require a replaying and/or pausing operation for broadcast of live data for the multi-field of view (FOV) videos. Further, the videos may be generated in a static or passive manner without any intelligent prediction of on-the-field action. Therefore, there is a need to associate an on-field action with the capture of the videos of the action, based on a prediction model of the on-field action.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and system to generate one or more multi-dimensional videos substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
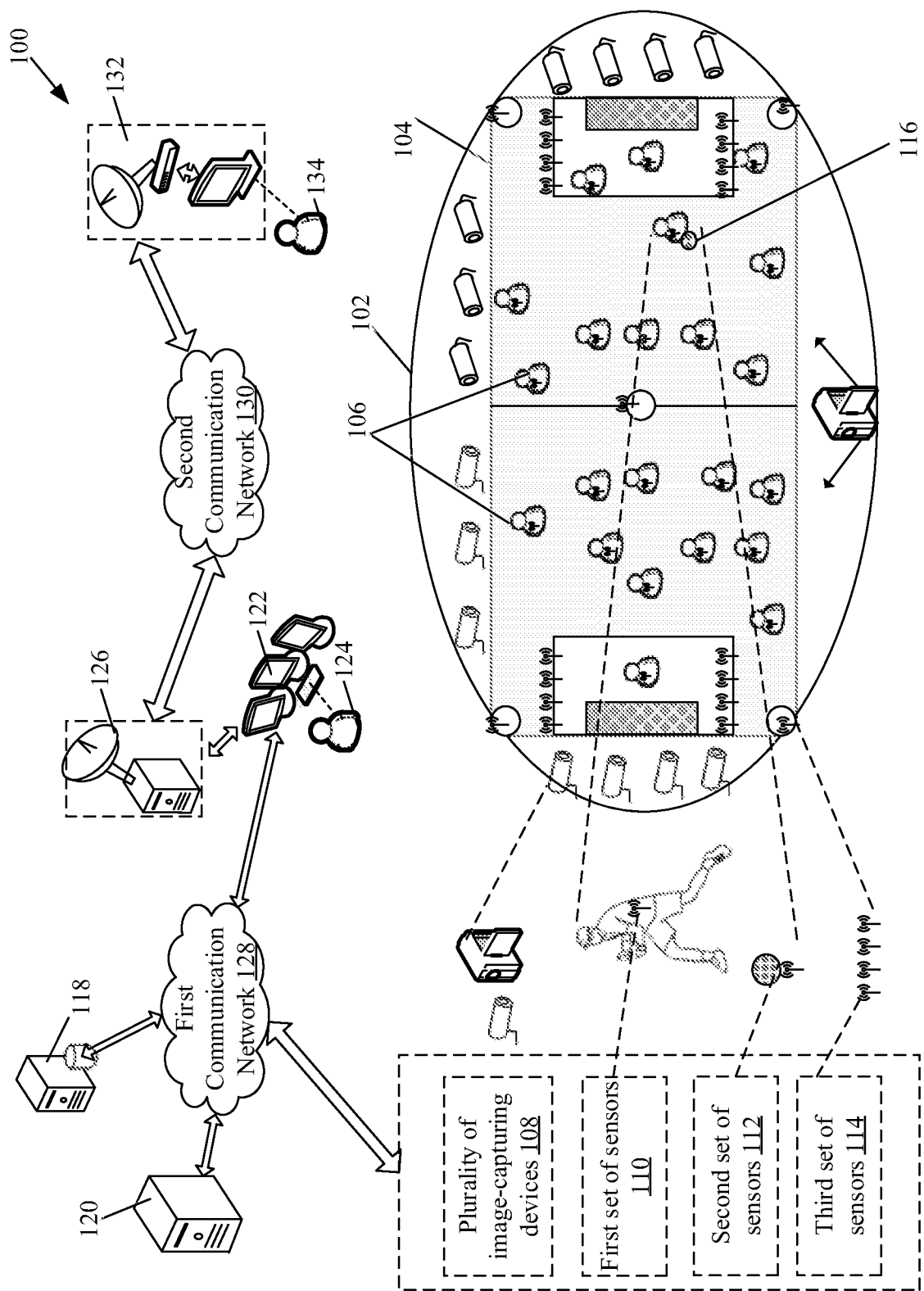
FIG. 1 illustrates an exemplary environment to generate one or more multi-dimensional videos, in accordance with an embodiment of the disclosure.

The following described implementations may be found in the disclosed method and system to generate one or more multi-dimensional videos. Exemplary aspects of the disclosure may include a method implementable in a server or an electronic device. The method may include the reception of a plurality of video feeds from a plurality of image-capturing devices that capture a predefined area. Further, sensor data may be received from a plurality of sensors associated with one or more subjects in the predefined area. Thereafter, a location-of-occurrence of an upcoming activity-of-interest may be predicted in the predefined area, based on the received plurality of video feeds, the received sensor data, and/or pre-stored statistical data of historical performance of the one or more subjects. Further, one or more control instructions may be communicated to one or more of the plurality of image-capturing devices. The one or more control instructions may be communicated to focus the one or more image-capturing devices towards the predicted location-of-occurrence to enable generation of a multi-dimensional video of the upcoming activity-of-interest.

In accordance with an embodiment, the pre-stored statistical data of the historical performance of a subject may comprise an action heat-map of the subject in previous sports events, a dominant foot-action of the subject, a dominant arm-action of the subject, a body-motion profile of the subject, a game-play of the subject in previous sports events, and/or a game-strategy of a team associated with the subject in previous sports events. Further, the sensor data may be recorded by a wearable device, a sensor positioned in sports equipment during the sports event, and/or a sensor placed at a pre-determined location in the pre-defined area. The sensor data may include motion capture data associated with one or more players, sports equipment, and/or one or more other objects-of-interest in the pre-defined area.

In accordance with an embodiment, the upcoming activity-of-interest may be predicted based on the received plurality of video feeds, the received sensor data, and/or the pre-stored statistical data. The location-of-occurrence of the upcoming activity-of-interest may be predicted by use of a machine learning technique applied on the received sensor data and/or the pre-stored statistical data, and one or more image processing techniques applied on the received plurality of video feeds.

In accordance with an embodiment, a current activity-of-interest may be tracked in the pre-defined area, based on the received plurality of video feeds and/or the received sensor data. Further, in accordance with an embodiment, a capture of a video of the upcoming activity-of-interest by each of the one or more image-capturing devices may be controlled. The video may be captured from a plurality of fields-of-view (FOVs) around the predicted location-of-occurrence before and/or during the occurrence of the activity-of-interest. In accordance with an embodiment, capture of the video of the upcoming activity-of-interest by each of the one or more image-capture devices may be controlled based on the communicated one or more control instructions.

In accordance with an embodiment, a first set of video feeds received from the one or more image-capturing devices may be stitched for the generation of the multi-dimensional video. The first set of video feeds may correspond to the capture of the activity-of-interest from the plurality of FOVs before and/or during the occurrence of the activity-of-interest. A four dimensional (4D) view of the activity-of-interest may be generated based on the stitching of the received first set of video feeds. The 4D view may correspond to the generated multi-dimensional video.

In accordance with an embodiment, one or more views, such as a normal view, a slow-motion view, an augmented-reality view, and/or the four-dimensional (4D) view, associated with the pre-defined area may be generated in real time or near-real time. The one or more views of the sports event may be generated, based on the received plurality of video feeds, the received sensor data, and/or the received first set of video feeds. In accordance with an embodiment, the 4D view may correspond to a three-dimensional (3D) view of the sports event captured around the location-of-occurrence from a plurality of FOVs by the one or more image-capturing devices (from the plurality of image-capturing devices) in real time or near real-time. Thus, the 4D view may include the 3D view with an additional time-dimension of real time or near real-time as a fourth coordinate. In accordance with an embodiment, the 4D view may correspond to a time-dimension such that the video may be time-warped at a view-time. The time warping of the video may correspond to a view-time pause or fast-forward of video frames. That is, a viewer may be shown a 3D view of the video with an option to pause or fast forward the 3D view in real-time or near-real time.

In accordance with an embodiment, the one or more circuits may be further configured to communicate the generated one or more views to a broadcast-controller terminal associated with the sports event in real-time or near-real time, via a Light-Fidelity (Li-Fi) based communication. A person having ordinary skill in the art may understand that the scope of the disclosure should not be limited to the use of Li-Fi based communication. Any other communication medium that may enable fast real-time communication between devices may also be used. Display of an interface on a broadcast controller terminal may be controlled to enable switching among the normal view, the slow-motion view, the augmented reality view, and/or the 4D view.

In accordance with an embodiment, at least one subject may be identified as an impact player from the one or more subjects in the predefined area associated with the sports event. The identification of the at least one subject from the one or more subjects may be based on the pre-stored statistical data of the historical performance of the one or more subjects, a current performance of the one or more subjects in the sports event, and/or the received sensor data. Display of an interface on the broadcast controller terminal may be controlled to enable swiveled-viewing of the sports event around the impact player. The swiveled-viewing may be based on a stitching of the first set of video feeds in real-time or near real-time. In accordance with an embodiment, the 4D view may also be used for the swiveled-viewing.

In accordance with an embodiment, one or more deciding moments of the sports event may be identified based on at least the prediction of the location-of-occurrence of the upcoming activity-of-interest, the received plurality of video feeds, and/or the received sensor data. Further, a summary video of the sports event may be generated based on said identified one or more deciding moments. The summary video may be broadcast to a plurality of subscriber-terminals as a highlight of the sports event.

In accordance with an embodiment, at least one of the plurality of image-capturing devices may be re-positioned to capture a different FOV and/or a different location in the predefined area during the switched-viewing and/or the swiveled-viewing of the sports event on a broadcast controller terminal. Further, a live broadcast feed of the sports event may be modified for a plurality of subscriber-terminals in real time or near-real time. The modification of the live broadcast feed may be based on at least the switched-viewing and/or swiveled-viewing of the sports event, by use of an interface displayed on the broadcast controller terminal. In accordance with an embodiment, the generated (and/or modified) multi-dimensional video with one or more views of the sports event may be broadcast in real time or near-real time to a plurality of subscriber terminals, via at least one of: the Internet, a Satellite-television (TV) infrastructure, and/or a Cable-TV infrastructure.

FIG. 1 illustrates an exemplary environment to generate one or more multi-dimensional videos, in accordance with an embodiment of the disclosure. With reference to FIG. 1, there is shown an exemplary environment 100. The exemplary environment 100 may include a stadium 102, a pre-defined area 104, one or more subjects 106, a plurality of image-capturing devices 108, a first set of sensors 110, a second set of sensors 112, a third set of sensors 114, a sports equipment 116. The exemplary environment 100 may further include a database server 118, an application server 120, a broadcast-controller terminal 122, a broadcast apparatus 126, a first communication network 128, a second communication network 130, and a subscriber terminal 132. Further, shown herein in FIG. 1 is a broadcast-controller user 124, who may operate the broadcast-controller terminal 122. In addition, FIG. 1 illustrates a subscriber-user 134, who may use the subscriber terminal 132.

The stadium 102 may correspond to a sports ground at which the sports event may be organized. For instance, the stadium 102 may host a football match between two teams. The stadium 102 may include the pre-defined area 104, which may be associated with the game-play of the sports event. The one or more subjects 106 may participate in the sports event as players of the sports event. The game-play of the sports event may involve an interaction of at least one of the one or more subjects 106 and the sports equipment 116 (such as the ball, in case of football) within the pre-defined area 104.

The plurality of image-capturing devices 108 may be configured to capture a video of the sports event as it happens within the pre-defined area 104 on the stadium 102. Examples of the plurality of image-capturing devices 108 may include, but not limited to, a spider camera, an on-field camera, a drone-camera, and/or a wide-angle camera that may be configured to capture the video feed from a plurality of FOVs in the pre-defined area 104. In accordance with an embodiment, the plurality of image-capturing devices 108 may correspond to networked-cameras, which may be connected wirelessly (or based on a wired connection) to the first communication network 128. In accordance with an embodiment, the plurality of image-capturing devices 108 may also include human-controlled cameras, which may be controlled by personnel deployed in the stadium 102 to capture the sports event and/or the broadcast-controller user 124. The plurality of image-capturing devices 108 may communicate with the application server 120 and/or the broadcast-controller terminal 122, via the first communication network 128. For instance, the plurality of image-capturing devices 108 may transmit a plurality of video feeds that capture the pre-defined area 104, to the application server 120, and/or the broadcast-controller terminal 122, via the first communication network 128. In accordance with an embodiment, the communication between the application server 120, the broadcast-controller terminal 122, and the plurality of image-capturing devices may be via a Li-Fi based communication network. A person having ordinary skill in the art may understand that the scope of the disclosure should not be limited to the use of Li-Fi based communication. Any other communication medium that may enable fast real-time communication between devices may also be used.

In accordance with an embodiment, one or more of the plurality of image-capturing devices 108 may be directed to focus towards a specific location in the pre-defined area 104, by the application server 120, via the first communication network 128. One or more control instructions may be communicated by the application server 120 based on a prediction of the specific location as a location-of-occurrence of an upcoming activity-of-interest in the pre-defined area 104, during the course of the sports event. Alternatively, the one or more control instructions may be received from the broadcast-controller terminal 122, in response to a command received from the broadcast-controller user 124.

A person with ordinary skill in the art may understand that the plurality of image-capturing devices 108 may be positioned around the pre-defined area 104 such that an ongoing action in the sports event may be captured from multiple angles simultaneously. Further, a set of image-capturing devices, from the plurality of image-capturing devices 108, may be configured to capture depth information that may correspond to a particular FOV. The set of such image-capturing devices may capture video feeds with one or more overlapping FOVs to generate stereoscopic video frames that may correspond to the one or more overlapping FOVs and include depth information pertaining to objects in such FOVs.

The first set of sensors 110 may be configured to be positioned on/around the one or more subjects 106, to track the game-play associated with the sports event. For instance, each sensor from the first set of sensors 110 may be placed on the dress/uniform of a respective subject from the one or more subjects 106. Alternatively or additionally, each of the first set of sensors 110 may be worn as a wearable device by the one or more subjects 106. For instance, each subject may have a sensor placed on his/her dress and another sensor worn as a wearable device such as a smart wrist band. The first set of sensors 110 may track one or more physiological parameters of the one or more subjects 106 in real time, during the sports event. Examples of the one or more physiological parameters may include, but may not be limited to, a heart rate, a blood pressure, a running speed, a perspiration rate, a foot-action, and/or an arm-action, associated with each of the one or more subjects 106. In accordance with an embodiment, the first set of sensors 110 may be implemented in one or more of: a wearable device, a smart watch, a helmet sensor for impact detection, a smart band, and/or a physiological sensor embedded in the dress/uniform, or accessories worn by the one or more subjects 106.

The second set of sensors 112 may be configured to track the sports equipment 116 during the sports event. For instance, in case of football, the second set of sensors 112 may be placed at various points on a surface or within the ball. A sensor from the second set of sensors 112 may be configured to detect a speed and/or displacement of the ball during the game-play. Another sensor from the second set of sensors 112 may be configured to detect an angular displacement and/or rotational velocity (such as, in terms of revolutions per minute (rpm)) of the ball during the game-play. In addition, a third sensor from the second set of sensors 112 may be configured to detect a height of the ball with respect to the ground level (when the ball is kicked in the air). Further, a fourth sensor from the second set of sensors 112 may be configured to determine an air pressure inside the ball and/or a force with which the ball is hit, during the game-play. Examples of the second set of sensors 112 may include, but not limited to, a snick-o-meter, an infra-red imaging sensor, a radio-wave based sensor, a tension sensor, a microphone, a tachometer, an accelerometer, a gyroscope, a barometer, and/or an air-pressure sensor.

The third set of sensors 114 may be configured to track the game-play of the sports event around pre-determined locations within the pre-defined area 104, in real-time. For instance, the third set of sensors 114 may be located in a region that may surround the goal posts, the corners, and/or the center of the field, in case of football. The third set of sensors 114 may provide sensor data associated with game-play of the sports event around specific regions of interest (with respect to strategic game-plan) in the pre-defined area 104 to simultaneously augment sensor data from the first set of sensors 110 and the second set of sensors 112. Examples of the third set of sensors 114 may include, but not limited to, a speed gun, pressure sensors, audio-capture devices, image-capture devices, an infra-red imaging sensor, and/or accelerometers.

The sports equipment 116 may correspond to an object that may be used during the course of the game-play of the sports event as an object-of-contention between two teams (or players of opposite teams). In such a case, the sports equipment 116 may correspond to the football. However, in other sports, each player may also be provided with equipment which may or may not serve as an object-of-contention between the two opposite teams or players. For instance, in case of hockey, the sports gear for each player may be a hockey; however, this may not be an object-of-contention between players. The object-of-contention may be a hockey puck. In accordance with an embodiment, the sports equipment 116 may be provided with a set of inbuilt sensors (such as the second set of sensors 112). The inbuilt sensors may measure sensor data associated with the sports equipment 116, and communicate this sensor data to the application server 120 or to an intermediate aggregator device that may collect the sensor data and finally communicate this data to the application server 120. A person having ordinary skill in the art may understand that the disclosure may be implemented without the use of the intermediate aggregator device, that is, the intermediate aggregator device may be optional. However, in a scenario where one or more intermediate aggregator devices are used, these intermediate aggregator devices may be installed within the predefined area at one or more predetermined locations. In accordance with an embodiment, each intermediate aggregator device may monitor one or more sensors in its vicinity to collect the sensor data. The communication between the intermediate aggregator devices and the one or more sensors may be performed over a sensor network such as by use of an Internet-of-Things (IoT) network or a Machine-type-communication (MTC) network. The intermediate aggregator device may report the sensor data collected from the one or more sensors to the application server 120 in real-time, over a Li-Fi based communication network.

The database server 118 may comprise suitable logic, circuitry, interfaces, and/or code that may be configured to store statistical data related to the one or more subjects 106. In accordance with an embodiment, the statistical data may include a historical performance data of the one or more subjects 106 from previous sports events. The statistical data may further include data that pertains to a current form and/or recent form of the one or more subjects 106, with respect to the sports event. Examples of the pre-stored statistical data of a subject may include an action heat-map of the subject in the previous sports events, a dominant foot-action of the subject, a dominant arm-action of the subject, and/or a body-motion profile of the subject. Other examples of the pre-stored statistical data of a subject may include a game-play of the subject in the previous sports events, and/or a game-strategy of a team and/or coach associated with the subject in the previous sports events. The database server 118 may be updated with events related to the current sports event based on the plurality of video feeds and/or the sensor data, in real time or near-real time. In accordance with an embodiment, the database server 118 may be implemented by use of one or more database technologies known in the art. Further, the database server 118 may communicate with the first communication network 128 through one or more database connectivity protocols known in the art.

A person with ordinary skill in the art may understand the database server 118 may be implemented as an application program hosted and/or running on the application server 120, and/or the broadcast-controller terminal 122. In such a scenario, the functionalities of the database server 118 may be performed by the application program implemented on the application server 120 and/or the broadcast-controller terminal 122, without departure from the scope of the disclosure.

The application server 120 may comprise suitable logic, circuitry, interfaces, and/or code that may be configured to generate the one or more multi-dimensional videos. In accordance with an embodiment, the application server 120 may be configured to receive a plurality of video feeds from the plurality of image-capturing devices 108. Further, the application server 120 may receive sensor measurements as sensor data from at least the first set of sensors 110, which may be associated with the one or more subjects 106 in the pre-defined area 104. In addition, the application server 120 may extract the pre-stored statistical data of historical performance of the one or more subjects 106, from the database server 118. The application server 120 may be further configured to predict a location-of-occurrence of an upcoming activity-of-interest in the pre-defined area 104. The prediction of the location-of-occurrence may be based on the received plurality of video feeds, the received sensor data (from at least the first set of sensors 110), and/or the extracted statistical data. In accordance with an embodiment, the application server 120 may predict the upcoming activity-of-interest based on the received plurality of video feeds, the received sensor data, and/or the extracted statistical data. The prediction of the location-of-occurrence may be performed by use of one or both of a machine learning techniques applied on the received sensor data and/or the extracted statistical data, and one or more image processing techniques applied on the received plurality of video feeds.

A person with ordinary skill in the art may understand that the application server 120 may be implemented as a server that hosts and runs as an application on the broadcast-controller terminal 122. In such a scenario, the functionalities of the application server 120 may be performed by the application implemented on the broadcast-controller terminal 122, without departure from the scope of the disclosure.

The broadcast-controller terminal 122 may comprise suitable logic, circuitry, interfaces, and/or code that may be configured to display an interface to the broadcast-controller user 124, to control live broadcast of the sports event. In accordance with an embodiment, the broadcast-controller terminal 122 may be configured to receive the generated one or more multi-dimensional videos from the application server 120, by use of the first communication network 128. The broadcast-controller terminal 122 may also receive the plurality of video feeds captured by the plurality of image-capturing devices 108. In accordance with an embodiment, the broadcast-controller terminal 122 may present the received one or more multi-dimensional videos and/or the plurality of video feeds of the sports event to the broadcast-controller user 124, via the interface. In accordance with an embodiment, the interface may be generated at the application server 120, and remotely displayed at the broadcast-controller terminal 122 for receiving input from the broadcast-controller user 124. The interface may enable the broadcast-controller user 124 to choose a real-time feed from the generated one or more multi-dimensional videos, the plurality of videos feeds, or a video feed directly received from a main broadcast camera. The main broadcast camera may one of the plurality of image-capturing devices 108. The real-time feed chosen by the broadcast-controller user 124 may then be broadcasted live by the broadcast apparatus 126 to subscriber terminal 132 of the subscriber-user 134, via the second communication network 130.

The broadcast-controller terminal 122 may enable the broadcast-controller user 124 to perform a swiveled-viewing and/or a switched-viewing of the sports event, based on the generated multi-dimensional video, via the interface. The swiveled-viewing may correspond to a 3D rotatable view of the sports event around an impact player identified during the sports event. The impact player may be identified from the one or more subjects 106 in the pre-defined area 104 based on the pre-stored statistical data, a current form of the one or more subjects 106, and/or the sensor data received from the sensors (such as at least the first set of sensors 110). The switched-viewing may correspond to a type of switching of the multi-dimensional video of the sports event between a normal view, a slow-motion view, an augmented reality view, and/or the 4D view. In accordance with an embodiment, at least one of the plurality of image-capturing devices 108 may be configured to be re-positioned to capture a different FOV and/or a different location in the pre-defined area 104 during the swiveled-viewing and/or switched-viewing of the sports event on the broadcast-controller terminal 122. The at least one of the plurality of image-capturing devices 108 may be re-positioned in response to an instruction from the broadcast-controller user 124. Alternatively, the application server 120 may transmit one or more re-positioning instructions to the at least one the plurality of image-capturing devices 108, based on a change of a type of view of the multi-dimensional video by the broadcast-controller user 124. Exemplary scenarios of interfaces of views associated with switched-viewing and swiveled-viewing are explained in FIGS. 6A to 6E.

In accordance with an embodiment, the broadcast-controller user 124 may choose to create advertisement slots in the live broadcast and introduce commercial ads of one or more sponsors in these slots. Further, the broadcast-controller user 124 may view the multi-dimensional video of the sports event from various views and choose to present a selected view for the live broadcast. For instance, the broadcast-controller user 124 may perform the swiveled-viewing and/or the switched-viewing of the sports event, as described above. Alternatively and/or intermittently, the broadcast-controller user 124 may choose a view from the plurality of video feeds captured for live broadcast by the plurality of image-capturing devices 108. Further, the broadcast-controller user 124 may also use the broadcast-controller terminal 122 to control human-controlled cameras, from amongst the plurality of image-capturing devices 108, to capture ongoing action in the sports event from desired locations and/or FOVs. A video footage captured by the human controlled cameras may also be compiled with the plurality of video feeds for further processing by the application server 120.

The broadcast apparatus 126 may comprise suitable logic, circuitry, interfaces, and/or code that may be configured to perform a live broadcast or telecast of the sports event. In accordance with an embodiment, the broadcast apparatus 126 may include a communication circuit that may be configured to perform the live broadcast of the sports event to a plurality of subscriber terminals (such as the subscriber terminal 132) of respective subscriber users (such as the subscriber-user 134). The live broadcast or telecast of the sports event may include the plurality of video feeds captured by the plurality of image-capturing devices 108, and/or a view from among the generated one or more multi-dimensional videos. As discussed, the broadcast-controller terminal 122 may display the plurality of video feeds and/or the one or more multi-dimensional videos of the sport event to the broadcast-controller user 124, via the interface. Thereafter, the broadcast apparatus 126 may perform a live broadcast of a view of the sports event selected by the broadcast-controller user 124 in real time or near-real time.

In accordance with an embodiment, the broadcast apparatus 126 may transmit the one or more multi-dimensional videos, generated by the application server 120, to the subscriber terminal 132, in real time or near-real time. A person skilled in the art may understand that the subscriber-user 134 may be required to pay an addition fee to receive the one or more multi-dimensional videos, in addition to the regular broadcast of the sports event. The subscriber terminal 132 may enable the subscriber-user 134 to perform operations such as switched-viewing and/or swiveled-viewing of the live broadcast, based on the reception of the one or more multi-dimensional videos.

The first communication network 128 may be configured to enable communication between the database server 118, the application server 120, the broadcast-controller terminal 122, the plurality of image-capturing devices 108, and/or one or more sensors (such as, the first set of sensors 110, the second set of sensors 112, and the third set of sensors 114). The first communication network 128 may be implemented by one or more wired or wireless communication technologies known in the art. Examples of the wired or wireless communication networks may include Internet, an Intranet, a cellular telephone network, a wireless local area network (LAN), and/or a metropolitan area network (MAN). In accordance with an embodiment, at least a portion of the first communication network 128 may be implemented based on Light-Fidelity (Li-Fi) based communication technology. For instance, the application server 120 may communicate the various multidimensional videos such as the normal view, slow motion view, time-warped 4D view, swiveled view, etc., to the broadcast-controller terminal 122 by use of a Li-Fi network.

The second communication network 130 may be configured to enable broadcast of live video feed of the sports event to the subscriber terminal 132, by use of the broadcast apparatus 126, controlled by the broadcast-controller terminal 122. The first communication network 128 may be implemented by one or more wired or wireless communication technologies known in the art. Examples of the wired or wireless communication networks may include Internet, an Intranet, a cellular telephone network, a wireless local area network (LAN), and/or a metropolitan area network (MAN). In addition, the live video feed associated with the second communication network 130 may also be broadcast over terrestrial TV network, cable TV network, Internet TV, interactive TV (iTV) network, Satellite TV, and/or direct-to-home (DTH) TV network.

The subscriber terminal 132 may comprise suitable logic, circuitry, interfaces, and/or code that may be configured to display video feed associated with live or delayed broadcast of the sports event to the subscriber-user 134. In accordance with an embodiment, the subscriber terminal 132 may be installed on the premises (residential or official) of the subscriber-user 134 (based on non-commercial or commercial usage of the subscriber terminal 132). The subscriber-user 134 may be required to subscribe with a service provider of the subscriber terminal 132 to access or use the subscriber terminal 132, based on a payment of a pre-determined fee. Further, the subscriber-user 134 may also be required to have a subscription for a channel associated with the broadcast of the sports event to view the broadcast. However, a person skilled in the art may understand that the channel associated with the broadcast of the sports event may be part of the basic subscription for the subscriber terminal 132. In such a case, payment of a separate subscription fee for that channel may not be necessary.

A person with ordinary skill in the art may understand that though the subscriber terminal 132 has been illustrated as a television with a set-top-box and overhead-dish, the scope of the disclosure should not be limited to this illustrative example. The subscriber terminal 132 may be implemented as one of: a smart phone, a wearable electronic device, a tablet computer, a laptop, a desktop/personal computer, an outdoor-media screen, and/or an advertisement screen.

In operation, the plurality of image-capturing devices 108 may capture the plurality of video feeds of the pre-defined area 104, in the stadium 102 that may host the sports event. The one or more subjects 106 may participate as players of two opposite sides of the sports event. Each of the one or more subjects 106 may have an associated sensor (pinned to a dress/uniform, shoe, or worn as a wearable device, such as a smart band or smart watch) to measure sensor data of that player during the game-play. The first set of sensors 110 may correspond to such sensors that may be associated with the one or more subjects 106. Further, the second set of sensors 112 may be provided at a surface (or inside) the sports equipment 116 (such as, the football) to measure sensor readings during the game-pay that are associated with the sports equipment 116. In addition, the third set of sensors 114 may be placed at pre-determined locations within the pre-defined area 104 (such as the center, the D-square, and/or the corners) to track game-play associated with that pre-determined locations.

In accordance with an embodiment, the application server 120 may receive the plurality of video feeds from the plurality of image-capturing devices 108. Further, the application server 120 may receive sensor data from one or more of the first set of sensors 110 (hereinafter referred as the first sensor data). In addition, the application server 120 may also receive the sensor readings of sensors from the second set of sensors 112 and/or the third set of sensors 114 (hereinafter referred as the second sensor data and the third sensor data, respectively).

In accordance with an embodiment, the application server 120 may be configured to track a current activity-of-interest in the pre-defined area 104, based on the received plurality of video feeds and/or the received sensor data (such as the first sensor data, the second sensor data and/or the third sensor data). The application server 120 may extract the pre-stored statistical data of historical performance of the one or more subjects 106 from the database server 118.

In accordance with an embodiment, the application server 120 may be configured to predict the location-of-occurrence of the upcoming activity-of-interest in the pre-defined area 104. The application server 120 may also predict the upcoming activity-of-interest. The location-of-occurrence and/or the upcoming activity-of-interest may be predicted by use of a machine learning technique applied on the received sensor data and/or the pre-stored statistical data. The prediction of the location of occurrence and the activity-of-interest may also be predicted by use of and one or more image-processing techniques applied on the received plurality of video feeds.

In accordance with an embodiment, the application server 120 may be configured to communicate the one or more control instructions to one or more of the plurality of image-capturing devices 108, in the pre-defined area 104. The one or more control instructions may be configured to direct the one or more image-capturing devices to focus towards the predicted location-of-occurrence to enable the generation of the multi-dimensional video of the upcoming activity-of-interest. An exemplary scenario of the control of the one or more image-capturing devices for the capture of the upcoming activity-of-interest is explained in FIG. 5.

In accordance with an embodiment, each of the directed one or more image-capturing devices capture a video of the upcoming activity-of-interest, from a plurality of FOVs around the predicted location-of-occurrence. The video may be captured before and/or during the occurrence of the activity-of-interest, based on the one or more control instructions. Thereafter, the one or more image-capturing devices may generate a first set of video feeds based on the capture of the aforementioned video, and transmit the first set of video feeds to the application server 120. Thus, the first set of video feeds may correspond to the capture of the activity-of-interest from the plurality of FOVs before and/or during the occurrence of the activity-of-interest. In accordance with an embodiment, the application server 120 may be configured to stitch together the first set of video feeds for the generation of the multi-dimensional video.

In accordance with an embodiment, the application server 120 may be further configured to identify at least one impact player from the one or more subjects 106 in the pre-defined area 104, as explained above. The identification of the at least one impact player may be based on the pre-stored statistical data, a current performance of the one or more subjects 106, and/or the received sensor data. In accordance with an embodiment, the application server 120 may be configured to re-position a set of image-capturing devices from the plurality of image-capturing devices 108 to focus on the at least one impact player from various FOVs around the impact player. Further, at least two image-capturing devices from the plurality of image-capturing devices 108 may be positioned such that video frames of an overlapping FOV are captured by the at least two image-capturing devices. Hence, with such an arrangement, the two image-capturing devices may provide depth information related to the at least one impact player. Further, the set of the image-capturing devices may provide a multi-FOV video feed of the player from the various FOVs around the impact player. The application server 120 may be configured to stitch together the multi-FOV video feed and use the depth information to form a 3D image map around the impact player. In accordance with an embodiment, the application server 120 may be configured to transmit the 3D image map associated with the impact player to the broadcast-controller terminal 122, to enable swiveled-viewing of the sports event around the impact player.

In accordance with an embodiment, the generation of the multi-dimensional view may further include generation of the 4D view of the activity-of-interest, based on the stitching of the received first set of video feeds by the application server 120. The 4D view may correspond to a 3D view around the location-of-occurrence captured from a plurality of FOVs by the one or more image-capturing devices 108 at real time or near real-time (including projected frames of a future time instance, based on prediction of the upcoming activity-of-interest). Further, the application server 120 may be configured to generate the normal view, the slow-motion view, the augmented-reality view, and/or the 4D view of the sports event in real time or near-real time. The aforementioned views may be generated based on the received plurality of video feeds, the received sensor data, and/or the received first set of video feeds.

In accordance with an embodiment, the application server 120 may be configured to communicate the various generated views to the broadcast-controller terminal 122. In accordance with an embodiment, the communication between the application server 120 and the broadcast-controller terminal 122 may be performed over the first communication network 128. In an exemplary embodiment, the first communication network 128, between the broadcast-controller terminal 122, the application server 120, the database server 118, the plurality of image-capturing devices 108, the sensors (such as the first set of sensors 110, the second set of sensors 112, and/or the third set of sensors 114), may be implemented by use of Li-Fi-based communication. A person having ordinary skill in the art may understand that the scope of the disclosure should not be limited to the implementation of the first communication network 128 by use of Li-Fi based communication. Any other communication medium that may enable fast real-time communication between devices may be used to implement the first communication network 128. In accordance with an embodiment, the sensors (the first set of sensors 110, the second set of sensors 112, and/or the third set of sensors 114) may be connected with one another and with the application server 120 over a sensor network. The sensor network may be implemented by use of an Internet-of-Things (IoT) network and/or a Machine-type-communication (MTC) network.

The application server 120 may generate an interface for the broadcast-controller terminal 122. In accordance with an embodiment, the broadcast-controller terminal 122 may be configured to enable the broadcast-controller user 124 to perform switched-viewing or swiveled-viewing of the sports event, via the interface. The interface of the broadcast-controller terminal 122 may display various views of the sports event that include the plurality of video feeds and/or the one or more multi-dimensional views that include the various aforementioned received views (generated by the application server 120). The application server 120 may control the display of these views on the interface of the broadcast-controller terminal 122. Further, the interface may facilitate a selection of one or more views from the various views of the sports event simultaneously displayed to the broadcast-controller user 124.

In accordance with an embodiment, at least one of the plurality of image-capturing devices 108 or certain image-capturing devices may be re-positioned within the pre-defined area 104 to a different location during the switched-viewing and/or the swiveled-viewing of the sports event. Thus, the video feed that is viewed by the broadcast-controller user may be updated in real time or near-real time, based on the type of view chosen by the broadcast-controller user 124.

For instance, the various views may be displayed by the interface, via a picture-in-picture or a picture-over-picture window. The broadcast-controller user 124 may select a desired view from the various displayed views, via the interface. Based on the selected view, the live broadcast of the sports event to the subscriber terminal 132 may be modified. The broadcast apparatus 126 may broadcast the selected view to the subscriber terminal 132, via the second communication network 130. Exemplary scenarios of the various views displayed to the broadcast-controller user 124 via the interface of the broadcast-controller terminal 122 are explained in FIGS. 6A to 6E.

In accordance with an embodiment, the application server 120 may be further configured to identify one or more deciding moments of the sports event, based on the predicted location-of-occurrence, received plurality of video feeds, and/or received sensor data. In addition, the application server 120 may be configured to generate a summary video, based on the identified one or more deciding moments. The summary video may be transmitted by the broadcast apparatus 126 to a plurality of subscriber terminals (such as the subscriber terminal 132) as a highlight video of the sports event.

In accordance with an embodiment, the application server 120 may be configured to control transmission of the plurality of video feeds and/or the multi-dimensional video, with one or more views of the sports event (based on the choice of the broadcast-controller user 124). The transmission may be in real time or near real-time, to correspond to a live or a slight delayed broadcast/telecast of the sports event to a plurality of subscriber terminals (such as the subscriber terminal 132). In accordance with an embodiment, the transmission may be performed over the second communication network 130, by use of the Internet, a Satellite TV infrastructure, and/or a Cable TV infrastructure.

In accordance with an embodiment, the application server 120 may belong to an organization that may control the live broadcast of the sports event, such as a sponsor of the sports event or an organizing committee of the sports event. Alternatively, the application server 120 may belong to a mass media channel (such as a sports channel network, a news channel, and/or an independent sports journalist). In another scenario, the application server 120 may belong to a third party organization that may be hired on contract to perform predetermined video processing tasks related to the live broadcast (such as the generation and distribution of the multi-dimensional video).

Figure 2:
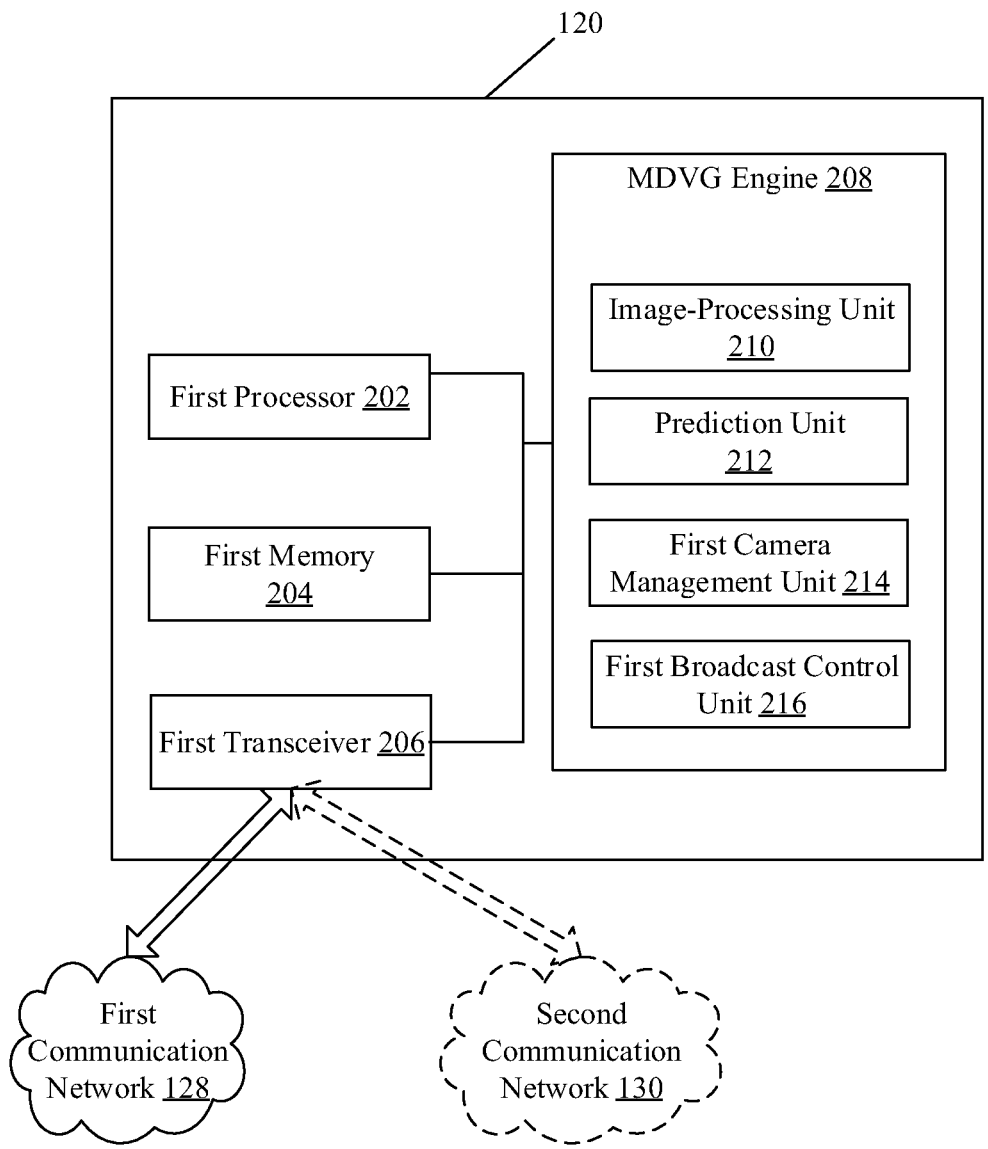
FIG. 2 is a block diagram that illustrates an exemplary application server for generation of one or more multi-dimensional videos, in accordance with an embodiment of the disclosure.

FIG. 2 is a block diagram that illustrates an exemplary application server for generation of the one or more multi-dimensional videos, in accordance with an embodiment of the disclosure. FIG. 2 is explained in conjunction with elements from FIG. 1. With reference to FIG. 2, there is shown the application server 120. The application server 120 may comprise a first processor 202, a first memory 204, a first transceiver 206, and a multi-dimensional video generation (MDVG) engine 208. The MDVG engine 208 may further comprise an image-processing unit 210, a prediction unit 212, a first camera management unit 214, and a first broadcast control unit 216.

In accordance with an embodiment, the application server 120 may be communicatively coupled to one or more other electronic devices or servers, through the first communication network 128, and/or the second communication network 130, via the first transceiver 206. The first processor 202 may be communicatively coupled to the first memory 204, the first transceiver 206, and/or the MDVG engine 208, via a system bus. In accordance with an embodiment, the application server 120 may be an electronic device that may include one or more logic, circuitry, and/or code configured to generate the one or more multi-dimensional video.

The first processor 202 may comprise suitable logic, circuitry, interfaces, and/or code that may be configured to execute a set of instructions stored in the first memory 204. The first processor 202 may be implemented, based on a number of processor technologies known in the art. Examples of the first processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The first memory 204 may comprise suitable logic, circuitry, and/or interfaces that may be configured to store a machine code and/or a computer program with at least one code section executable by the first processor 202. The first memory 204 may be further configured to store the plurality of video feeds received from the plurality of image-capturing devices 108. The first memory 204 may further store sensor data received from one or more sensors (such as the first set of sensors 110, the second set of sensors 112, and/or the third set of sensors 114). In addition, the first memory 204 may store statistical data of the historical performance of the one or more subjects 106, extracted from the database server 118. Examples of implementation of the first memory 204 may include, but not limited to, Random Access Memory (RAM), Read Only Memory (ROM), Hard Disk Drive (HDD), a Secure Digital (SD) card, and/or other Solid State Device (SSD).

The first transceiver 206 may comprise suitable logic, circuitry, interfaces, and/or code that may be configured to communicate with another electronic device or a server (not shown), via the first communication network 128, and/or the second communication network 130. The first transceiver 206 may implement known technologies to support wired or wireless communication. The first transceiver 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The first transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Li-Fi, Wi-MAX, a protocol for email, instant messaging, and/or Short Message Service (SMS).

The MDVG engine 208 may comprise suitable logic, circuitry, interfaces, and/or code that may be configured to generate the one or more multi-dimensional videos of the sports event, based on the plurality of video feeds, sensor data, and/or the statistical data, under the control of the first processor 202. In accordance with an embodiment, the MDVG engine 208 may be a part of the first processor 202. Alternatively, the MDVG engine 208 may be implemented as a separate processor or circuitry in the application server 120. In accordance with an embodiment, the MDVG engine 208 and the first processor 202 may be implemented as an integrated processor or a cluster of processors that perform the functions of the MDVG engine 208 and the first processor 202. In accordance with an embodiment, the MDVG engine 208 may be implemented as a set of instructions stored in the first memory 204, which upon execution by the first processor 202 may perform the functions of the MDVG engine 208.

The image-processing unit 210 may comprise suitable logic, circuitry, interfaces, and/or code that may be configured to process the plurality of video feeds received from the plurality of image-capturing devices 108. The image-processing unit 210 may analyze the plurality of video feeds for prediction of the location-of-occurrence of the activity-of-interest in the pre-defined area 104. Further, the image-processing unit 210 may stitch a set of video feeds received from one or more of the plurality of image-capturing devices 108, to generate a multi-dimensional video. In accordance with an embodiment, the image-processing unit 210 may be configured to identify each of one or more players from the one or more subjects 106 in the plurality of video feeds by use of facial recognition technique on the plurality of video feeds. Further, the image-processing unit 210 may be configured to identify and track a movement of the sports equipment 116 (such as the football) within the pre-defined area 104 during the game-play.

The prediction unit 212 may comprise suitable logic, circuitry, interfaces, and/or code that may be configured to predict the upcoming activity-of-interest and/or the location-of-occurrence of the activity-of-interest within the pre-defined area 104. The prediction unit 212 may predict the upcoming activity-of-interest and/or its location-of-occurrence by application of one or more machine learning techniques on the pre-stored statistical data and/or the sensor data. Further, the prediction unit 212 may receive analyses of the plurality of video feeds for prediction of the location-of-occurrence from the image-processing unit 210. The prediction unit 212 may also track a current activity-of-interest in the pre-defined area 104, based on the received plurality of video feeds and/or the received first sensor data. The prediction unit 212 may also be configured to regularly update the database server 118 with the current performance data of the one or more subjects 106, based on the first sensor data and the plurality of video feeds received from plurality of image-capturing devices 108.

The prediction unit 212 may also be configured to identify the at least one impact player in the one or more subjects 106. The impact player may be identified from the one or more subjects 106, based on the facial recognition of the one or more subjects 106 (performed by the image-processing unit 210), and performance statistics related to the one or more subjects 106. The prediction unit 212 may extract the performance statistics, such as current or recent form of the one or more subjects 106 from the database server 118. The prediction unit 212 may then identity the impact player, based on the recognized player's current/recent form the received plurality of video feeds and/or sensor data related to the player. Further, the prediction unit 212 may be further configured to predict the one or more deciding moments in the sports event and further generate a summary video as a highlight of the sports event, based on the one or more deciding moments.

The first camera management unit 214 may comprise suitable logic, circuitry, interfaces, and/or code that may be configured to direct one or more image-capturing devices to focus towards a desired location with a given FOV, to capture the upcoming activity-of-interest. As discussed, the prediction unit 212 may predict the location-of-occurrence of the upcoming activity-of-interest. The first camera management unit 214 may then calculate a difference between the current FOV of each image-capturing device that captures a current location and the desired FOV to capture the predicted location-of-occurrence. Further, a difference between the current rotation angle and/or orientation angle and the target rotation angle and/or orientation angle to achieve optimum capture of the desired FOV may be calculated. Based on the calculated differences, the first camera management unit 214 may select image-capturing devices that may be closest to the location-of-occurrence. The first camera management unit 214 may determine a rotation angle and/or an orientation angle required for each of these image-capturing devices to direct each of the selected image-capturing devices to the location-of-occurrence at the desired FOV. Accordingly, one or more command instructions may be formulated for re-direction of these image-capturing devices to the location-of-occurrence before the occurrence of the activity-of-interest. The first camera management unit 214 may send the one or more instruction commands to the one or more image-capturing devices, via the first transceiver 206, via the first communication network 128.

The first broadcast control unit 216 may comprise suitable logic, circuitry, interfaces, and/or code that may be configured to control the broadcast of the video feed of the sports event to a plurality of subscriber terminals (such as the subscriber terminal 132). In accordance with an embodiment, the first broadcast control unit 216 may enable the display of multiple views of the sports event, via the interface of the broadcast-controller terminal 122. In accordance with an embodiment, the multiple displayed views may include the plurality of video feeds and/or the generated multi-dimensional video (which may include a normal view, a slow-motion view, an AR view, and/or a 4D view). Further, the first broadcast control unit 216 may display multiple views around the predicted impact player (for 3D-swiveled viewing), on the broadcast-controller terminal 122, via the interface. The broadcast-controller user 124 may perform a switched-viewing and/or a swiveled-viewing of the pre-defined area 104 of the sports event, based on views of the pre-defined area 104 of the sports event displayed via the interface of the broadcast-controller terminal 122. From a choice of view of the broadcast-controller user 124, the first broadcast control unit 216 may perform real-time editing to the video footage of the sports event that may be sent out for broadcast by the broadcast apparatus 126 to the subscriber terminal 132.

In operation, the image-processing unit 210 may receive the plurality of video feeds of the sports event from the plurality of image-capturing devices 108. The image-processing unit 210 may identify each player in the sports event from among the one or more subjects 106, based on facial recognition. The image-processing unit 210 may also identify the sports equipment 116 (such as the football), based on an object recognition technique known in the art. Further, the image-processing unit 210 may process the plurality of video feeds to identify locations in the pre-defined area 104, where the sports equipment 116 and each player are positioned. The image-processing unit 210 may communicate information for further processing, such as the identified locations, and the recognized players positioned at these locations, and the location of the sports equipment 116 to the prediction unit 212.

The prediction unit 212 may extract statistics related to the game-play, the historical performance data of the recognized players, and/or the current/recent form of the recognized players from the database server 118. Further, the prediction unit 212 may receive sensor data from the first set of sensors 110, the second set of sensors 112, and/or the third set of sensors. The prediction unit 212 may correlate the information communicated by the image-processing unit 210 and the sensor data with the statistics extracted from the database server 118. Further, the prediction unit 212 may apply one or more machine learning techniques on the aforementioned correlated data to predict the upcoming activity-of-interest and/or the location-of-occurrence of the upcoming activity-of-interest.

The first camera management unit 214 may communicate the one or more instruction commands to the one or more of the plurality of image-capturing devices 108, based on the predicted location-of-occurrence, via the first transceiver 206, through the first communication network 128. The one or more instruction commands may direct the one or more image-capturing devices to capture the upcoming activity-of-interest from a plurality of FOVs around the predicted location-of-occurrence. The one or more image-capturing devices may then be accordingly re-positioned to focus on the predicted location-of-occurrence. New video feeds may then be received from the one or more image-capturing devices that may correspond to the predicted location-of-occurrence.

The image-processing unit 210 may be configured to stitch a set of video feeds received from one or more of the plurality of image-capturing devices 108, based on the communication of the one or more instruction commands to capture the activity-of-interest. The image-processing unit 210 may generate one or more multi-dimensional views of the sports event, based on the stitching of the set of video feeds. The first broadcast control unit 216 may enable display of plurality of video feeds and the one or more multi-dimensional views (generated by the image-processing unit 210) to the broadcast-controller user 124, via the interface of the broadcast-controller terminal 122. The one or more multi-dimensional views and/or the plurality of video feeds may be transmitted by the first transceiver 206 to the broadcast-controller terminal 122, via the first communication network 128.

In accordance with an embodiment, based on a run-time selection of one of the views by the broadcast-controller user 124, the first broadcast control unit 216 may modify the video feed for broadcast in real time. Further, based on the selected view, the first camera management unit 214 may send another instruction command to at least one such image-capture device of the plurality of image-capturing devices 108 for its re-position to a different location and/or around a different FOV in the pre-defined area 104. Further, the broadcast apparatus 126 may broadcast the modified video feed as the live broadcast of the sports event to the plurality of subscriber-terminals (such as the subscriber-terminal 132), via the second communication network 130.

Figure 3:
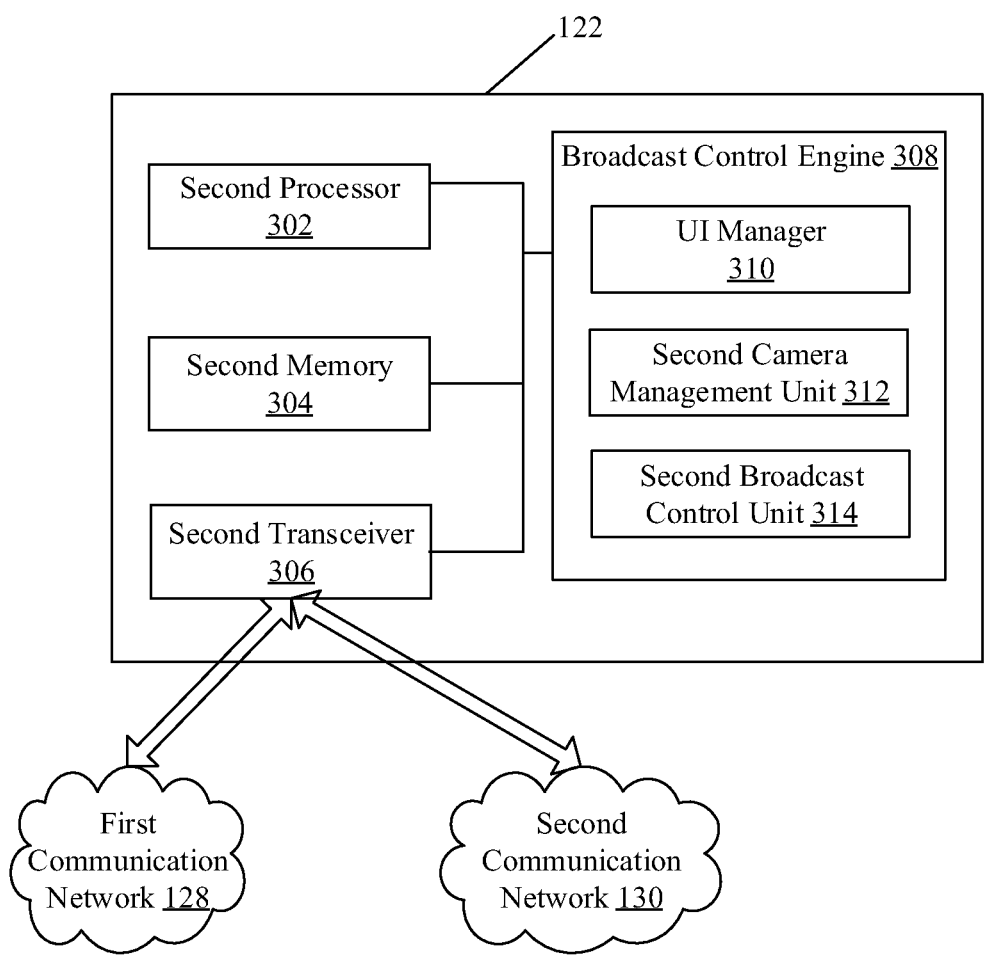
FIG. 3 is a block diagram that illustrates an exemplary broadcast-controller terminal that may be used to control live broadcast of a sports event, in accordance with an embodiment of the disclosure.

FIG. 3 is a block diagram that illustrates an exemplary broadcast-controller terminal that may be used to control the live broadcast of the sports event, in accordance with an embodiment of the disclosure. FIG. 3 is explained in conjunction with elements from FIG. 1 and FIG. 2. With reference to FIG. 3, there is shown the broadcast-controller terminal 122. The broadcast-controller terminal 122 may comprise a second processor 302, a second memory 304, a second transceiver 306, and a broadcast control engine 308. The broadcast control engine 308 may further comprise a user-interface (UI) manager 310, a second camera management unit 312, and a second broadcast control unit 314.

In accordance with an embodiment, the broadcast-controller terminal 122 may be communicatively coupled to one or more other electronic devices or servers, via the first communication network 128, and/or the second communication network 130, via the second transceiver 306. The second processor 302 may be communicatively coupled to the second memory 304, the second transceiver 306, and/or the broadcast control engine 308, via a system bus. In accordance with an embodiment, the broadcast-controller terminal 122 may correspond to an electronic device that may include one or more logic, circuitry, and/or codes configured to enable control of broadcast of the sports event to a plurality of subscriber terminals (such as the subscriber terminal 132). The broadcast-controller terminal 122 may display various views of the sports event for control of the live broadcast, based on a selection of a view by the broadcast-controller user 124.

The second processor 302 may comprise suitable logic, circuitry, interfaces, and/or code that may be configured to execute a set of instructions stored in the second memory 304. The second processor 302 may be implemented based on a number of processor technologies known in the art. Examples of the second processor 302 may be an X86-based processor, a Reduced Instruction Set Computing (RISC) processor, an Application-Specific Integrated Circuit (ASIC) processor, a Complex Instruction Set Computing (CISC) processor, and/or other processors.

The second memory 304 may comprise suitable logic, circuitry, and/or interfaces that may be configured to store a machine code and/or a computer program with at least one code section executable by the second processor 302. The second memory 304 may be further configured to store the plurality of video feeds received from the plurality of the image-capturing devices 108, and/or the one or more multi-dimensional videos received from the application server 120. Examples of implementation of the second memory 304 may include, but not limited to, Random Access Memory (RAM), Read Only Memory (ROM), Hard Disk Drive (HDD), a Secure Digital (SD) card, and/or other Solid State Device (SSD).

The second transceiver 306 may comprise suitable logic, circuitry, interfaces, and/or code that may be configured to communicate with another electronic device or a server (not shown) via the first communication network 128 and/or the second communication network 130. The second transceiver 306 may implement known technologies to support wired or wireless communication. The second transceiver 306 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The second transceiver 306 may communicate via wireless communication with networks, such as the Internet, an Intranet, and/or a wireless network, such as a cellular telephone network, a wireless local area network (LAN) and/or a metropolitan area network (MAN). The wireless communication may use a plurality of communication standards, protocols and technologies, such as a Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The broadcast control engine 308 may comprise suitable logic, circuitry, interfaces, and/or code that may be configured to control the live or a slight delayed broadcast of the generated one or more multi-dimensional videos. In accordance with an embodiment, the broadcast control engine 308 may be a part of the second processor 302. Alternatively, the broadcast control engine 308 may be implemented as a separate processor or circuitry in the broadcast-controller terminal 122. In accordance with an embodiment, the broadcast control engine 308 and the second processor 302 may be implemented as an integrated processor or a cluster of processors that perform the functions of the broadcast control engine 308 and the second processor 302. In accordance with an embodiment, broadcast control engine 308 may be implemented as a set of instructions stored in the second memory 304, which upon execution by the second processor 302 may perform the functions of the broadcast control engine 308.

The UI manager 310 may comprise suitable logic, circuitry, interfaces, and/or code that may be configured to manage display (or presentation) of an interface on the broadcast-controller terminal 122. In accordance with an embodiment, the interface may be adapted to display on one or more screens of the broadcast-controller terminal 122, such that each of the one or more screens displays at least one of the multiple views of the multi-dimensional video and/or the plurality of video feeds. In accordance with an embodiment, the UI manager 310 may communicate with the first broadcast control unit 216, for reception of the multiple views, via the second transceiver 306, via the first communication network 128. Based on a user-input of selection of a view for broadcast, the UI manager 310 may communicate an indication of the selected view to the first broadcast control unit 216, via the second transceiver 306, via the first communication network 128. Alternatively, the user-input may be communicated to the second broadcast control unit 314 via the system bus of the broadcast-controller terminal 122.

The second camera management unit 312 may comprise suitable logic, circuitry, interfaces, and/or code that may be configured to direct one or more image-capturing devices to focus towards a particular location with a given FOV to capture the activity-of-interest. The one or more instruction commands may be sent before and/or during the occurrence of the activity-of-interest, based on the user-input received from the broadcast-controller user 124. In accordance with an embodiment, the human-controlled cameras, from the plurality of image-capturing devices 108, may be controllable based on input received from the broadcast-controller user 124. The second camera management unit 312 may send the one or more instruction commands to the one or more image-capturing devices (including the human-controlled cameras), via the second transceiver 306, through the first communication network 128. Thus, in an embodiment, the second camera management unit 312 may be functionally similar to the first camera management unit 214. Though, in an embodiment, the second camera management unit 312 may send an indication of the sent one or more instruction commands to the first camera management unit 214, for synchronization purpose.

The second broadcast control unit 314 may comprise suitable logic, circuitry, interfaces, and/or code that may be configured to control the broadcast of the video feed of the sports event to a plurality of subscriber-terminals (such as the subscriber terminal 132). As discussed above, multiple views of the sports event may be displayed to the broadcast-controller user 124, via the interface of the broadcast-controller terminal 122. The multiple views may include the plurality of the video feeds and/or one or more multi-dimensional videos of the activity-of-interest. Based on a selection of a particular of view from the multiple views displayed to the broadcast-controller user 124, the second broadcast control unit 314 may perform real-time editing to the video footage of the sports event that may be sent out for broadcast by the broadcast apparatus 126 to the subscriber terminal 132. Thus, in an embodiment, the second broadcast control unit 314 may be functionally similar to the first broadcast control unit 216. In an embodiment, for synchronization purpose (at a regular interval), the second broadcast control unit 314 may send an indication of the selected view to the first broadcast control unit 216.

In operation, the UI manager 310 may receive the multiple views of the pre-defined area 104 of the sports event from the first broadcast control unit 216, via the second transceiver 306. The multiple views may include the plurality of video feeds captured by the plurality of image-capturing devices 108, and/or one or more multi-dimensional videos (generated by the application server 120). The one or more multi-dimensional videos may include the normal view, the slow-motion view, the AR view, and/or the 4D view. Further, one of the multi-dimensional views may include multiple views around the predicted impact player (for 3D swiveled-viewing).

The broadcast-controller user 124 may perform a switched-viewing (among the normal view of the video feed, the slow-motion view, the AR view, and/or the 4D view), via the interface of the broadcast-controller terminal 122. Further, the broadcast-controller user 124 may provide an input via the interface (rendered on the broadcast-controller terminal 122) to perform a swiveled-viewing of the sports event around an impact player of the sports event. Based on the view selected by the broadcast-controller user 124, the first camera management unit 214 may control re-positioning of at least one of the one or more image-capturing devices around the impact player or around the location-of-occurrence of activity-of-interest. Accordingly, one or more appropriate command instructions may be sent to the at least one image-capturing device to change the focus and/or FOV of the image-capturing device.

Further, the video feed to be broadcast to the plurality of subscriber-terminals (such as the subscriber terminal 132) may be edited in run-time based on the view selected by the broadcast-controller user 124. In accordance with an embodiment, the second broadcast control unit 314 may control the broadcast of the edited video feed of the sports event to the plurality of subscriber-terminals (such as the subscriber terminal 132), by the broadcast apparatus 126, via the second communication network 130.

In accordance with an embodiment, the broadcast control engine 308 with its components may not be provided in the broadcast-controller terminal 122. In such an embodiment, the broadcast-controller terminal 122 may receive one or more input from the broadcast-controller user 124, and communicate the received input to the application server 120 for further processing, and control of the broadcast.

Figure 4:
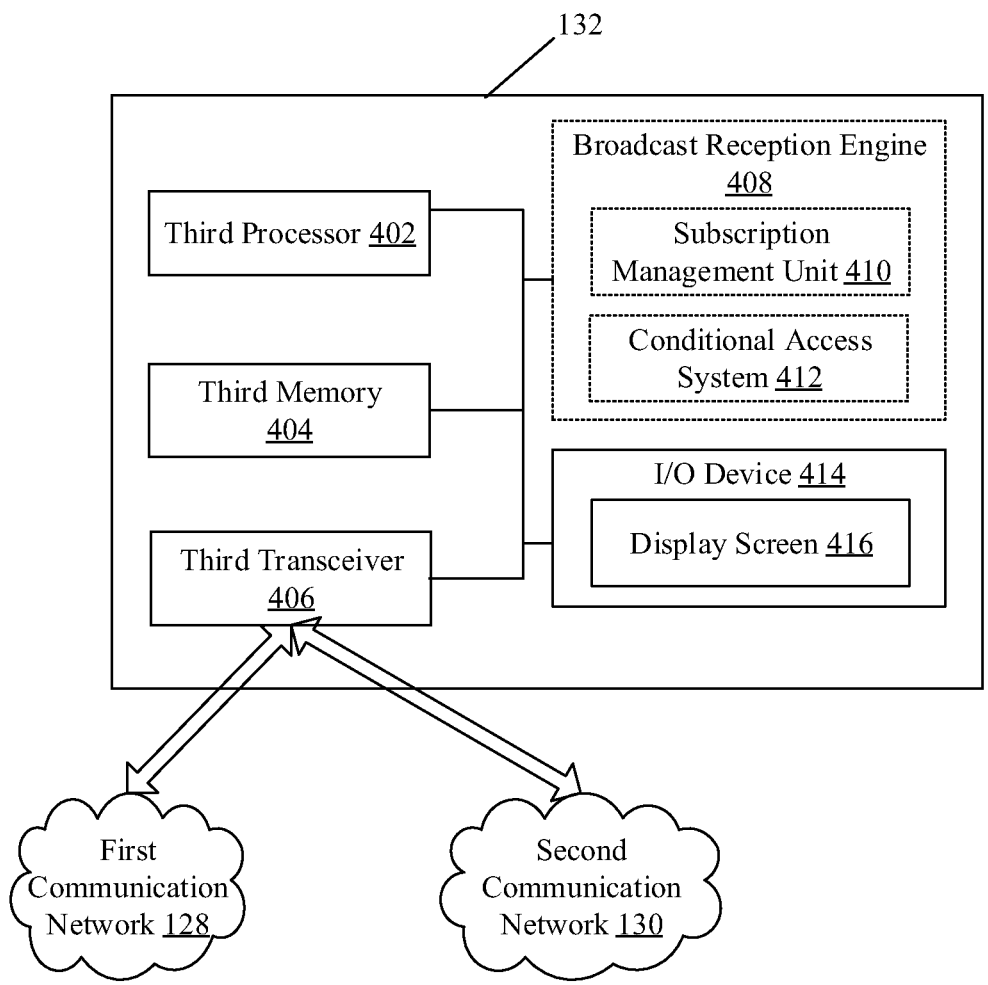
FIG. 4 is a block diagram that illustrates an exemplary subscriber terminal, for display of the live broadcast feed of the sports event to subscriber-user, in accordance with an embodiment of the disclosure.

FIG. 4 is a block diagram that illustrates an exemplary subscriber-terminal, in accordance with an embodiment of the disclosure. FIG. 4 is explained in conjunction with elements from FIG. 1. With reference to FIG. 4, there is shown the subscriber terminal 132. The subscriber terminal 132 may comprise a third processor 402, a third memory 404, a third transceiver 406, and a broadcast reception engine 408. The broadcast reception engine 408 may further comprise a subscription management unit 410, a conditional access system 412, an I/O device 414, and a display screen 416.

In accordance with an embodiment, the subscriber terminal 132 may be communicatively coupled to one or more other electronic devices or servers, via the first communication network 128 and/or the second communication network 130, by use of the third transceiver 406. The third processor 402 may be communicatively coupled to the third memory 404, the third transceiver 406, and/or the broadcast reception engine 408, via a system bus. In accordance with an embodiment, the subscriber terminal 132 may correspond to an electronic device that may include one or more logic, circuitry, and/or code that may be configured to display the live or delayed broadcast of the video feed of the sports event. In accordance with an embodiment, at least one view of the video feed may correspond to a multi-dimensional view that may include a 4D representation of the sports event (such as a 3D video feed generated in real-time or near real-time).

The third processor 402 may comprise suitable logic, circuitry, interfaces, and/or code that may be configured to execute a set of instructions stored in the third memory 404. The third processor 402 may be implemented, based on a number of processor technologies known in the art. Examples of the third processor 402 may be an X86-based processor, a Reduced Instruction Set Computing (RISC) processor, an Application-Specific Integrated Circuit (ASIC) processor, a Complex Instruction Set Computing (CISC) processor, and/or other processors.

The third memory 404 may comprise suitable logic, circuitry, and/or interfaces that may be configured to store a set of instructions executable by the third processor 402. The third memory 404 may be further configured to store a predetermined number of frames of a video feed received as a broadcast from the broadcast apparatus 126, to buffer the video feed. Examples of implementation of the third memory 404 may include, but not limited to, Random Access Memory (RAM), Read Only Memory (ROM), Hard Disk Drive (HDD), a Secure Digital (SD) card, and/or other Solid State Device (SSD).

The third transceiver 406 may comprise suitable logic, circuitry, interfaces, and/or code that may be configured to communicate with another electronic device or a server (not shown), via the second communication network 130. The third transceiver 406 may implement known technologies to support wired or wireless communication. The third transceiver 406 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The third transceiver 406 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The broadcast reception engine 408 may comprise suitable logic, circuitry, interfaces, and/or code that may be configured to enable the subscriber-user 134 to view the live or a slight delayed broadcast of the sports event based on the one or more multi-dimensional videos. In accordance with an embodiment, the broadcast reception engine 408 may be a part of the third processor 402. Alternatively, the broadcast reception engine 408 may be implemented as a separate processor or circuitry in the broadcast-controller terminal 122. In accordance with an embodiment, broadcast reception engine 408 and the third processor 402 may be implemented as an integrated processor or a cluster of processors that perform the functions of broadcast reception engine 408 and the third processor 402. In accordance with an embodiment, broadcast reception engine 408 may be implemented as a computer program code, stored in the third memory 404, which upon execution by the third processor 402, may perform the functions of the broadcast reception engine 408.

The subscription management unit 410 may comprise suitable logic, circuitry, interfaces, and/or code that may be configured to manage a subscriber-account of the subscriber-user 134, for usage of the subscriber terminal 132. The subscriber account may be renewable on a monthly, quarterly, annually, other predetermined period by payment of cash or use of creditable fees. Further, the subscriber account may cover a periodic subscription to bundle channels and/or services, such as the Internet, telephone, news/weather, and/or any other value added service (VAS). In addition, the television subscription may also include a provision for qualitative services, such as high-definition channel services, movie packages, sports packages, 3D and/or 4D channels, ad-free channels, and so on. One or more of the bundle of channels and/or services may be renewed together or piece-wise, based on a pricing model of a service provider selected by the subscriber-user 134. In accordance with an embodiment, the subscription management unit 410 may be provided as a subscriber identity module (SIM) card and/or smart user identification (S-UID) card that may be inserted into a slot in the conditional access system 412. The SIM card or S-UID card may include a cryptographic key, and a user specific key for verification of the user and validation of his/her account credentials.

The conditional access system 412 may comprise suitable logic, circuitry, interfaces, and/or code that may be configured to provide conditional access to the bundle of channels and/or services subscribed by the subscriber-user 134, based on accounting information associated with the subscriber account of the subscriber-user 134. When payment for a channel or service is received and the subscriber account is active, the channel or the service may be provided to the subscriber-user, on the subscriber terminal 132, via the conditional access system 412. In accordance with an embodiment, the conditional access system 412 may be implemented as a set-top-box connected to an overhead dish set-up (Satellite TV), when the subscriber terminal may be implemented as a television. Alternatively, the conditional access system 412 may be built into the television and the over-the-head dish may or may not be provided (such as in the case of Cable TV). In an embodiment, the subscriber terminal 132 may be implemented as an Internet TV terminal, via a smart phone, a smart wearable device, an Internet-connected advertisement screen, and/or outdoor media screen.

The I/O device 414 may comprise suitable logic, circuitry, interfaces, and/or code for various input and output devices that may be configured to communicate with the first processor 202. The I/O device 414 may be configured to receive an input from the subscriber-user 134. Further, the I/O device 414 may be configured to control the output of the audio video content via the display screen 416 and a speaker system (not shown). In accordance with an embodiment, the subscriber-user 134 may use the I/O device 414 to control various operations of the subscriber terminal 132, such as a change of channels, volume settings, video settings, and so on. The subscriber-user 134 may also use the I/O device 414 to view his/her subscriber account information/status. Examples of the input devices may include, but may not be limited to, an imaging unit, a camcorder, a touch screen, a keyboard, a mouse, a joystick, the microphone, a motion sensor, a light sensor, and/or a docking station. Examples of the output devices may include, but not limited to, the display screen 416, a projector screen, and/or a speaker.

In accordance with an embodiment, an input may be received at the subscriber terminal 132, such as a TV, from the subscriber-user 134. Based on the received input, the I/O device 414 may switch between the one or more multi-dimensional views (a normal view, a slow-motion view, an augmented reality view, a 4D view, a swiveled-view around the impact player), and/or the plurality of video feeds associated with the broadcast of the sports event. A person skilled in the art may understand that the subscriber-user 134 may be enabled to perform the above operations when the subscriber-user 134 takes 3D and/or 4D value-added subscriptions for the channel associated with the sports event broadcast.

The display screen 416 may comprise suitable circuitry and/or interfaces that may be configured to display image and/or video output to the subscriber-user 134. The display screen 416 may be configured to simultaneously receive one or more input actions from the subscriber-user 134, via a touch-sensitive screen. Such one or more input actions may be received from the subscriber-user 134 by means of a virtual keypad, a stylus, touch-based input actions, and/or a gesture. The display screen 416 may be realized through several known technologies such as, but not limited to, Liquid Crystal Display (LCD) display, Light Emitting Diode (LED) display, plasma display, and/or Organic LED (OLED) display technology.

In operation, the subscriber-user 134 may switch on the subscriber terminal 132. The subscription management unit 410 may verify the user and validate his/her account credentials including account balance and subscription information. Thereafter, the conditional access system 412 may check access rights related to the subscription and account of the subscriber-user 134. Based on the access rights check, the subscriber-user 134 may be granted access to bundles of channels and/or services that may be currently active. The broadcast of the sports event may be displayed to the subscriber-user 134 when the relevant channel is switched on. As explained above, the broadcast of the sports event may include multi-dimensional video content based on switched-viewing and/or swiveled-viewing of the multi-dimensional videos and/or normal viewing of one of the plurality of video feeds by the broadcast-controller user 124.

Figure 5:
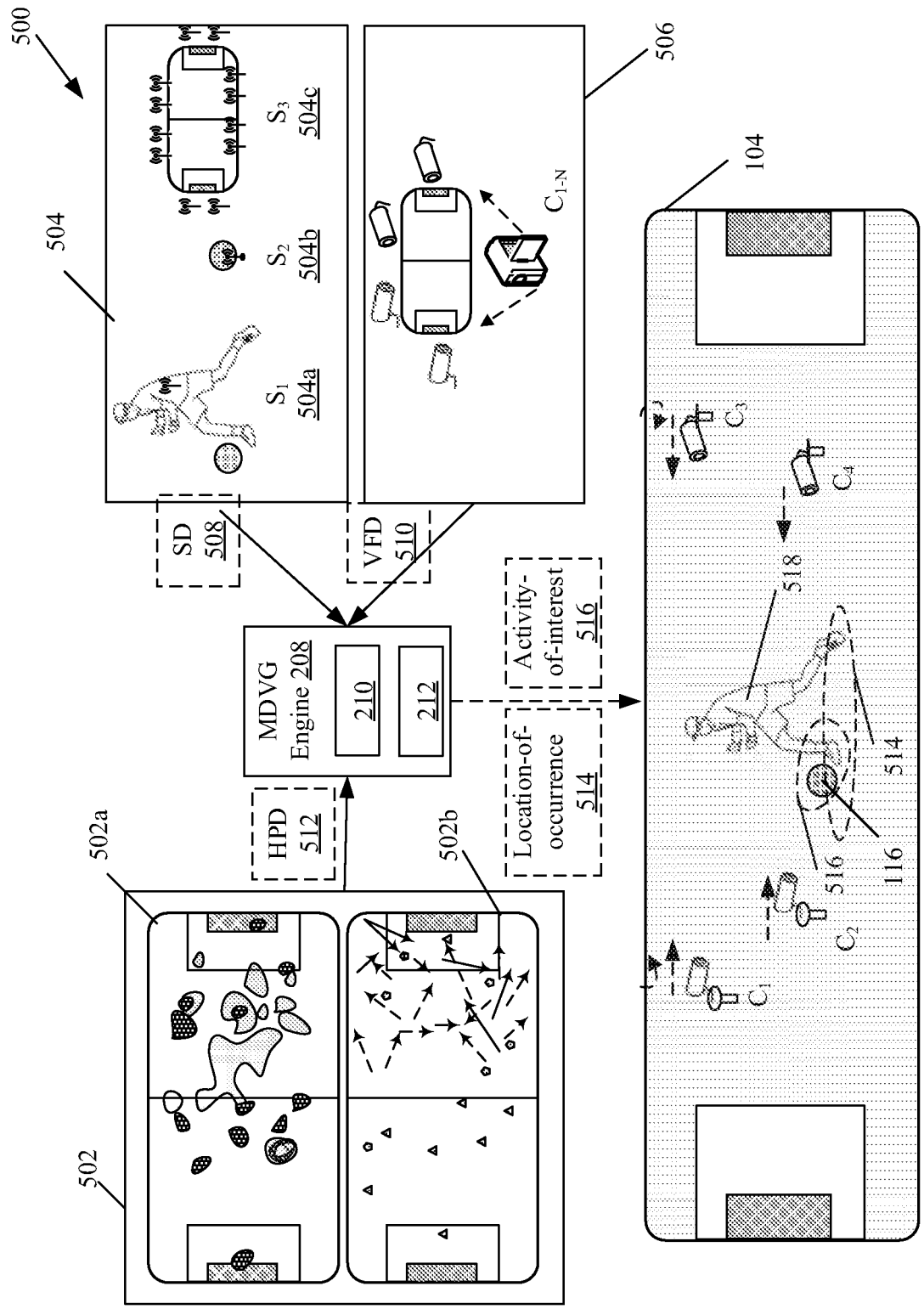
FIG. 5 illustrates an exemplary scenario of a prediction of a deciding moment, a location-of-occurrence of an activity-of-interest, and/or the activity-of-interest of the sports event, in accordance with an embodiment of the disclosure.

FIG. 5 illustrates an exemplary scenario of a prediction of a deciding moment and a location-of-occurrence of the deciding moment of the sports event, in accordance with an embodiment of the disclosure. With reference to FIG. 5, there is shown a scenario diagram 500, which is described herein in conjunction with elements from FIGS. 1, 2, 3, and 4. The scenario diagram 500 includes an illustration of past statistical data 502 of two soccer teams, including a first statistical data 502a and a second statistical data 502b. There is further shown a plurality of sensors 504, such as a first set of sensors 504a (represented as "S1"), a second set of sensors 504b (represented as "S2"), and a third set of sensors 504c (represented as "S3"). There is further shown a plurality of cameras 506 ("C1-N").

In accordance with the exemplary scenario, sensor data (SD) 508 received from the plurality of sensors 504, video feed data (VFD) 510 received from the plurality of cameras 506, and historical performance data (HPD) 512 extracted from the past statistical data 502, are shown as input to the MDVG engine 208 of the application server 120. For brevity of the current discussion, the MDVG engine 208 is shown to include the image-processing unit 210 and the prediction unit 212 of FIG. 2 (other components not shown). Further, the scenario diagram illustrates a location-of-occurrence 514 of an upcoming activity-of-interest 516, which may be predicted by the MDVG engine 208. Accordingly, there is shown a player 518, who may be predicted to be in possession of the ball at the predicted location-of-occurrence 514. Four cameras C1 to C4 of the plurality of cameras 506 may be dynamically directed towards the player 518 (near or around the predicted location-of-occurrence 514. The four cameras C1 to C4 may be focused on the predicted location-of-occurrence 514 before occurrence of the upcoming activity-of-interest 516 so that when the upcoming activity-of-interest 516 actually happens, it may be captured and a 4D view of a potential deciding moment may be generated and broadcast in real-time or near real-time. The potential deciding moment may correspond to the upcoming activity-of-interest 516.

In accordance with the exemplary scenario, the plurality of sensors 504 may correspond to the first set of sensors 110, the second set of sensors 112, and the third set of sensors 114. The plurality of cameras 506 may correspond to the plurality of image-capturing devices 108 (FIG. 1). The first statistical data 502a in the statistical data 502 may include a heat map of game-play action of the two soccer teams in the past matches. The second statistical data 502b in the statistical data 502 may include data indicative of game-play strategy and key players of both the teams in the past matches. Though not shown herein, the statistical data 502 may further include statistics related to a dominant foot-action of a player, a dominant arm-action of a player, and/or a body motion profile of a player.

In operation, during the sports event (such as a soccer or football match), the plurality of sensors 504 may measure the sensor data 508. The plurality of sensors 504 may include the first set of sensors 504a (which may be worn as wearable device or pinned on the dress/uniform of a player) and the second set of sensors 504b (placed on/inside the ball, which is the sports equipment 116). The plurality of sensors 504 may also include the third set of sensors 504c, which may be embedded at pre-determined locations (at corners, center, near both the goal posts, etc.) in the pre-defined area 104.

Further, the plurality of cameras 506 (such as wide area cameras, drone-cameras, and/or spider-cameras) may capture a plurality of video feeds to generate the VFD 510. The plurality of sensors 504 and the plurality of cameras 506 may track a current activity-of-interest (not shown in FIG. 5) during the sports event. An example of the current activity-of-interest may include a current location of the ball and a current action tracked in the pre-defined area 104.

In accordance with an embodiment, in parallel to the tracking of the current activity-of-interest by the plurality of sensors 504 and the plurality of cameras 506, the prediction unit 212 may also be configured to predict the upcoming activity-of-interest 516 in the sports event. To that end, the prediction unit 212 of the application server 120 may extract the statistical data 502 from the database server 118. The extracted statistical data 502, received by the MDVG engine 208, is represented in FIG. 5, by the HPD 512.

In accordance with an embodiment, the image-processing unit 210 may process the VFD 510 to identify and locate each player from the one or more subjects 106 from the VFD 510, by use of facial recognition. The image-processing unit 210 may further use object detection techniques known in the art to identify and locate the sports equipment (such as the football) in the VFD 510. The image-processing unit 210 may communicate the identity and location of the recognized players and the location of the ball to the prediction unit 212. The prediction unit 212 may correlate the information communicated by the image-processing unit 210 and the SD 508, with the HPD 512. Further, the prediction unit 212 may apply one or more machine learning techniques to the aforementioned correlated data to predict the upcoming activity-of-interest 516 and its location-of-occurrence 514.

For instance, in the scenario diagram 500, the prediction unit 212 may identify the player 518 as the impact player. As shown the player 518 may be located around the location-of-occurrence 514 (which may coincide with the location of the ball). In such a scenario, the first camera management unit 214 may direct one or more of the plurality of cameras 506, towards the player 518, to capture a video of the player 518 from multiple FOVs. As shown in FIG. 5, the cameras C1, C2, C3, and C4 of the plurality of cameras 506 may capture a video of the player 518 from the multiple FOVs. In accordance with an embodiment, the captured video may correspond to a deciding moment of the sports event. The video captured by the cameras C1, C2, C3, and C4, may be sent to the image-processing unit 210 for real-time or near real-time generation of a multi-dimensional video, based on the stitching together of the individual video feeds captured each of the cameras C1, C2, C3, and C4.

In accordance with an embodiment, the multi-dimensional video may correspond to the 4D view of the player 518. The 4D view may include the 3D view of the player 518 around the location-of-occurrence 514 that may be generated and broadcast in real-time or near real-time. To generate such a 4D view or video, one or more of the plurality of cameras 506 may be re-positioned in advance to be able to focus on the predicted location-of-occurrence 514 so that when the upcoming activity-of-interest 516 actually happens, it may be captured, the 4D effect generated, and broadcast quickly. Thus, one or more deciding moments of the sports event may be captured in real-time or near-real time, as described above.

Figure 6B:
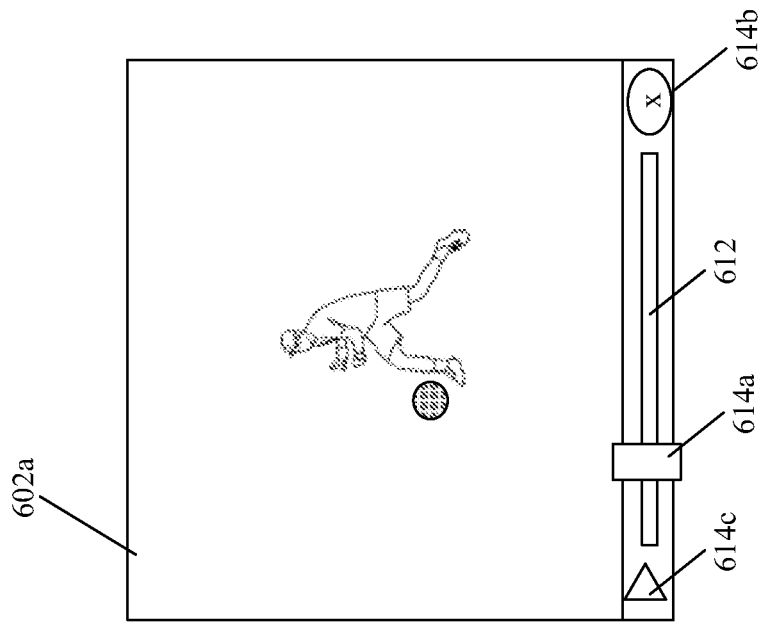
FIGS. 6A, 6B, 6C, 6D, and 6E illustrate exemplary scenarios of one or more interfaces that may be presented on a subscriber terminal, in accordance with an embodiment of the disclosure.
Figure 6A:
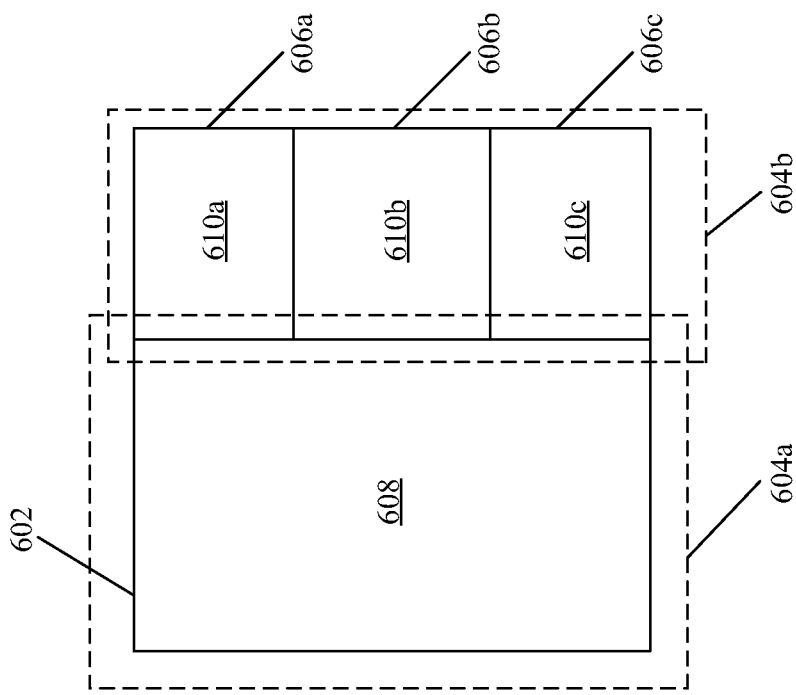

FIGS. 6A, 6B, 6C, 6D, and 6E illustrate exemplary scenarios of one or more interfaces that may be presented on the subscriber terminal 132, in accordance with an embodiment of the disclosure. FIGS. 6A to 6E are described in conjunction with elements from FIGS. 1, 2, 3, and 4. With reference to FIG. 6A, there is shown an exemplary interface 602, a first region 604a, and a second region 604b. The second region 604b further includes a first sub-region 606a, a second sub-region 606b, and a third sub-region 606c. A normal view 608 may be rendered on the first region 604a of the interface 602. A slow-motion (Slo-Mo) preview 610a, an augmented-reality (AR) preview 610b, a 4D preview 610c may be rendered on the first sub-region 606a, the second sub-region 606b, and the third sub-region 606c respectively.

The interface 602 may be displayed on the subscriber terminal 132 during the broadcast of the sports event. The interface 602 may be adapted to display multiple views or previews at the same time. The interface 602 may display one or more video frames that may include at least one of the plurality of video feeds captured by the plurality of image-capturing devices 108 and/or a multi-dimensional view from the one or more multi-dimensional views selected by the broadcast-controller user 124.

The first region 604a may be adapted to display the normal view 608 of the sports event broadcast, in real-time or near-real time. In accordance with an embodiment, the normal view 608 may include one of the plurality of video feeds associated with one of the plurality of FOVs around the one or more subjects 106. In accordance with an embodiment, video frames related to the sports event may be displayed within each of the sub-regions of the second region 604b, as a picture-in-picture or picture-over-picture interface in parallel to the normal view 608 of the sports event broadcast in the first region 604a.

In accordance with an embodiment, each preview may correspond to a demo or a sample clipping of the corresponding the view, to be iteratively played back for a predetermined time. The first sub-region 606a may display the Slo-Mo preview 610a of the sports event broadcast. The Slo-Mo preview 610a may correspond to a preview of one of the plurality of video feeds played back at a slower than normal playback rate.

The second sub-region 606b may display the AR preview 610b of the sports event broadcast. The AR preview 610b may correspond to a preview of one of the plurality of video feeds correlated with a metadata of constituent objects of the video, presented as a sub-title or info-bar with the object. Example of the metadata may include kinetic or location characteristics of the respective objects, sensor data overlaid on the constituent objects of the displayed video.

The third sub-region 606c may display the 4D preview 610c of the sports event broadcast. The 4D preview 610c may correspond to a preview of the one or more multi-dimensional videos generated by the application server 120. The one or more multi-dimensional videos may include at least one 3D video of the sports event captured before, during, and/or after the predicted activity-of-interest. A person with ordinary skill in the art may understand may understand that the subscriber-user 134 may switch between the various views. The switch between views may be enabled based on a choice between one of the first region 604a, the first sub-region 606a, the second sub-region 606b, or the third sub-region 606c. The switch may be based on user input, such as the subscriber-user 134, at the subscriber terminal 132. Alternatively, the switch may be based a selection of a particular view from the various views to be broadcasted at the broadcast-controller terminal 122 side.

With reference to FIG. 6B, there is shown an interface 602a rendered on the subscriber terminal 132. In accordance with an embodiment, the interface 602a may be displayed in response to selection of the first sub-region 606a, which may be associated with the Slo-Mo preview 610a on the interface 602 (of FIG. 6A). The interface 602a includes a timeline bar 612, which may include a slider 614a, a multiplier-index 614b, and a playback start/stop button 614c.

The interface 602a may display a sequence of video frames from the plurality of video feeds captured by the plurality of image-capturing devices 108. The slider 614a of the timeline bar 612 may enable the subscriber-user 134 to choose a video frame from the plurality of video feeds and start viewing the sequence of the video frames from the chosen video frame or video feed. The multiplier-index 614b of the timeline bar 612 may enable the subscriber-user 134 to provide a factor that may be used to control a rate of playback (e.g., 0.66 times) of the sequence of the video frames. For example, a slow motion playback from the chosen video frame. Further, the playback start/stop button 614c may be provided to accordingly start or stop the playback of the sequence of video frames at the selected playback rate from the selected video frame.

Figure 6D:
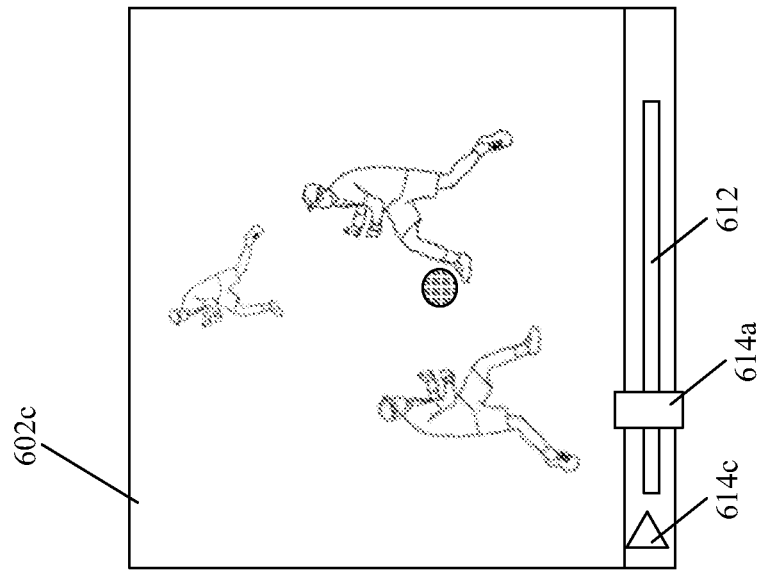
Figure 6C:
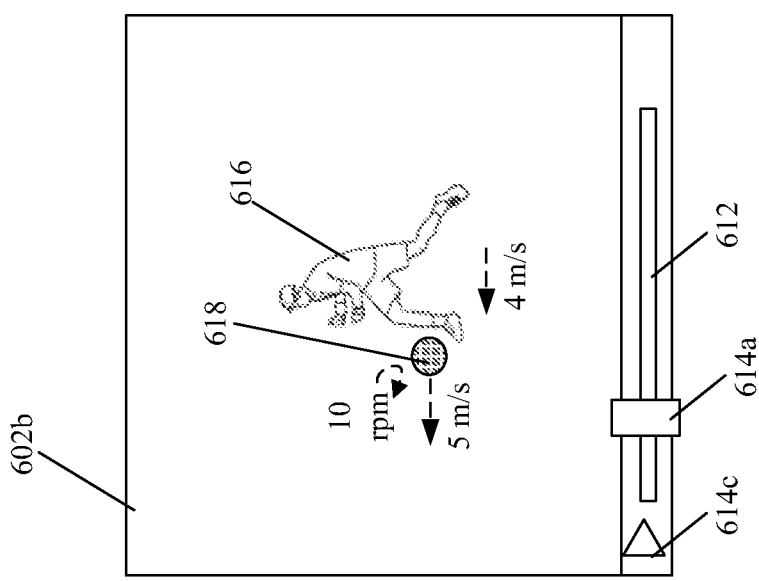

With reference to FIG. 6C, there is shown an exemplary interface 602b rendered on the subscriber terminal 132. In accordance with an embodiment, the interface 602b may be displayed in response to selection of the second sub-region 606b, which may be associated with the AR preview 610b on the interface 602 (of FIG. 6A). The interface 602b includes the timeline bar 612, which may include the slider 614a and the playback start/stop button 614c.

The interface 602b may display an augmented reality view of the sports event broadcast. The augmented reality view may correspond to a display of video frames along with enhanced metadata related to a subject/object in the displayed video frame. For instance, the interface 602b illustrates a video frame in which a player 616 (who may be an impact player) kicks a ball 618, where metadata, such as revolutions per minute (rpm) of the ball 618 (such as "10" rpm), a direction in which the ball 618 is hit (such as towards the left), and a velocity of the ball 618 with respect to the ground (such as 5 meters per second (m/s)), may be further overlaid on the interface 602b. Further, the player 616 is depicted as running towards a certain direction with a velocity of "4" meter/second (m/s). Hence, the subscriber-user 134 may be provided with an augmented view of the sports event based on the real-time metadata related to the sports event.

With reference to FIG. 6D, there is shown an exemplary interface 602c rendered on the subscriber terminal 132. In accordance with an embodiment, the interface 602c may be displayed in response to selection of the third sub-region 606c, which may be associated with the 3D preview 610c on the interface 602 (of FIG. 6A). The interface 602c may include the timeline bar 612, which may include the slider 614a and the playback start/stop button 614c.

The interface 602c may correspond to a 4D time-warped (TW) view of the sports event broadcast that may include a 3D representation of each object in the video frames during a playback of a sequence of video frames on the interface 602c. In accordance with an embodiment, the 4D-TW view may be generated at a run-time, based on a video feed capture by one or more of the plurality of image-capturing devices 108, which may be re-positioned towards the predicted location-of-occurrence of the predicted activity-of-interest in the sports event. Thus, the 4D-TW view may include 3D data associated with objects in each video frame, where the 4D-TW view may be generated and broadcast in real-time or near real-time. In accordance with an embodiment, the time warping of the video frames may correspond to run-time selection of the pause or fast-forward features of video frames. Here, each 4D video frame may include 3D representation of constituent objects of the video frame, as explained above, based on a live transmission of data from the broadcast-controller terminal 122, the application server 120, and/or the broadcast apparatus 126.

Figure 6E:
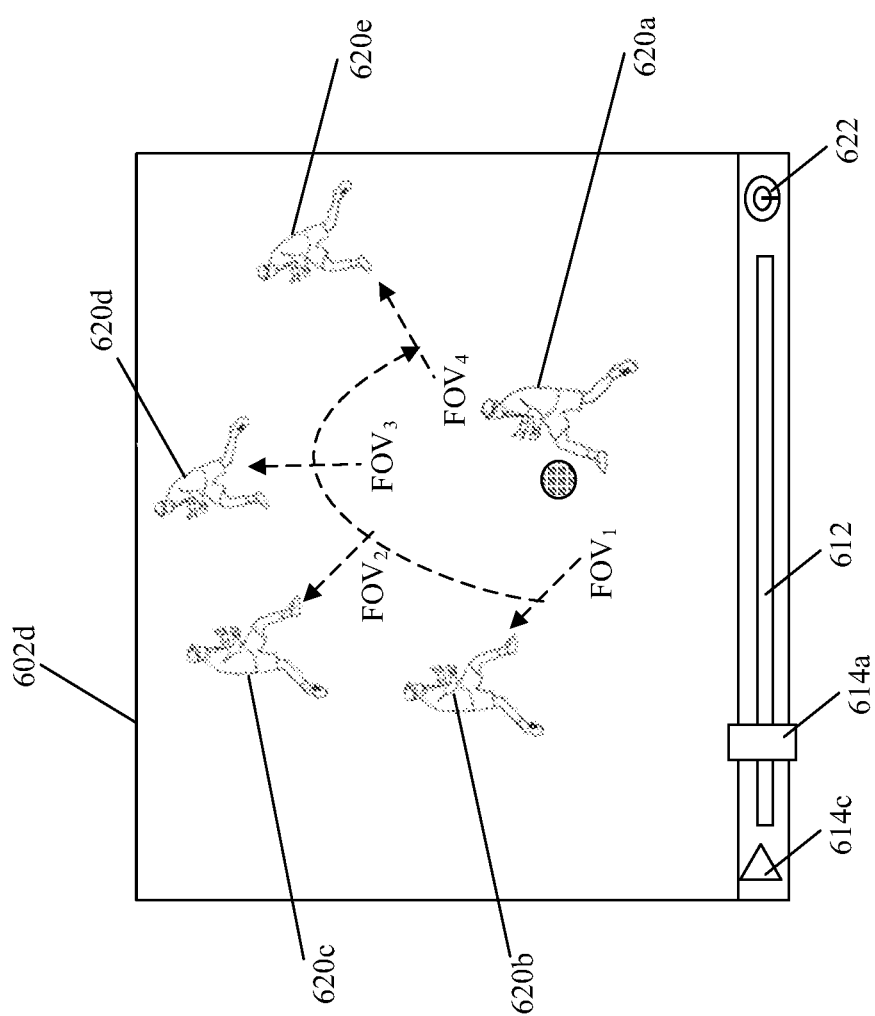

With reference to FIG. 6E, there is shown an exemplary interface 602d rendered on the subscriber terminal 132, during a swiveled view of the sports event around an impact player 620a. In accordance with an embodiment, the interface 602d may also be displayed in response to selection of the third sub-region 606c, which may be associated with the 3D preview 610c on the interface 602 (of FIG. 6A). In accordance with an embodiment, on selection of the third sub-region 606c, the subscriber terminal 132 may display the interface 602c or 602d based on a preset preference of the subscriber-user 134 for swiveled viewing of the sports event. The preference may be preset as a user-input through the interface 602 (of FIG. 6A). The interface 602c includes the timeline bar 612, which may include the slider 614a, the playback start/stop button 614c, and a view rotation knob 622. The exemplary interface 602d may display objects and/or players captured around various FOVs of the impact player 620a. For instance, the interface 602d displays a first player 620b, a second player 620c, a third player 620d, and a fourth player 620e captured around multiple FOVs of the impact player 620a, such as FOV1, FOV2, FOV3, FOV4, respectively enhancing the user experience of the subscriber-user 134.

The interface 602d may also include a 3D view (or a 4D-TW view) of the broadcast of the sports event, similar to that displayed via the interface 602c. As discussed previously, the interface 602c may display a sequence of 3D video frames with run-time option to seek, pause, and playback the video at various time instances before, during, and/or after the predicted or current activity-of-interest. The interface 602d may enhance this functionality of the interface 602c based on an option to enable viewing the activity-of-interest from multiple FOVs. That is, the interface 602c may enable a 3D swiveled-view around the impact player 620a (who may possess the ball and thus be involved in the activity-of-interest). Based on the swiveled-viewing around the impact player 620a, views at multiple FOVs around the impact player 620a may be explored. In accordance with an embodiment, the view rotation knob 622 may enable the rotation or swiveled-viewing of the view around the impact player 620a.

For instance, initially, the interface 602d may display video feed focused at players that lie between the FOV1 and the FOV3 around the impact player 620a. In such a view, the first player 620b, the second player 620c, and the third player 620d may be focused in the video feed. Further, once the view rotation knob 622 may be rotated in certain direction, such as towards right of the subscriber-user 134, the input may be communicated to the application server 120. The application server 120 may then re-position certain cameras so that the FOV coverage of the video feed around the impact player 620a may shift by one interval towards the right. Thus, at this stage, the interface 602d may display video frames focused at players that lie between the FOV2 and the FOV4 around the impact player 620a. In such a view, the second player 620c, the third player 620d, and a fourth player 620e may be focused in the video feed. A person with ordinary skill in the art will understand that the interfaces 602, 602a, 602b, 602c, and 602d, are provided for illustrative purposes and should not be construed to limit the scope of the disclosure. The disclosure may be implemented in various other scenarios with one or more variations, without departure from the scope of the disclosure.

As previously explained in FIGS. 1 and 2, each view from the scenario diagrams 6A to 6E may presented on the subscriber terminal 132, based on a selection of that view on the broadcast-controller terminal 122 by the broadcast-controller user 124. Further, the broadcast-controller terminal 122 may display interfaces with views that may be similar to the respective views presented in the scenario diagrams 6A to 6E. Alternatively, the subscriber terminal 132 may be sent the plurality of the video feeds and/or the one or more multi-dimensional videos generated by the application server 120. An interface and/or views presented on the subscriber-user 134 may depend on preferences and/or selection made by the subscriber-user 134 or a selection of views or switching of views by the broadcast-controller user 124 via the one or more interfaces displayed on the broadcast-controller terminal 122.

Figure 7A:
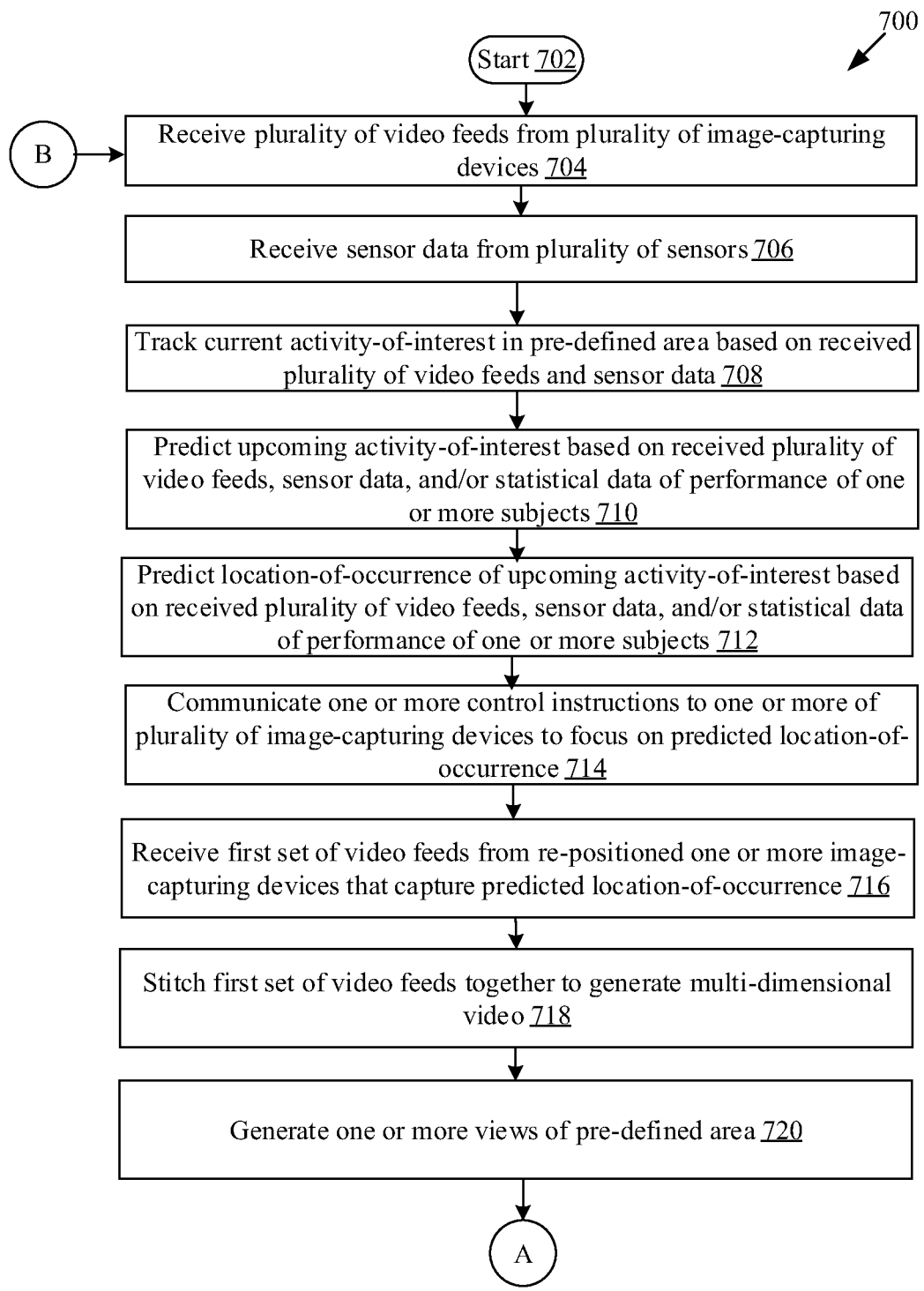
FIGS. 7A and 7B, collectively, depict a flow chart that illustrates a method to generate one or more multi-dimensional videos, in accordance with an embodiment of the disclosure.
Figure 7B:
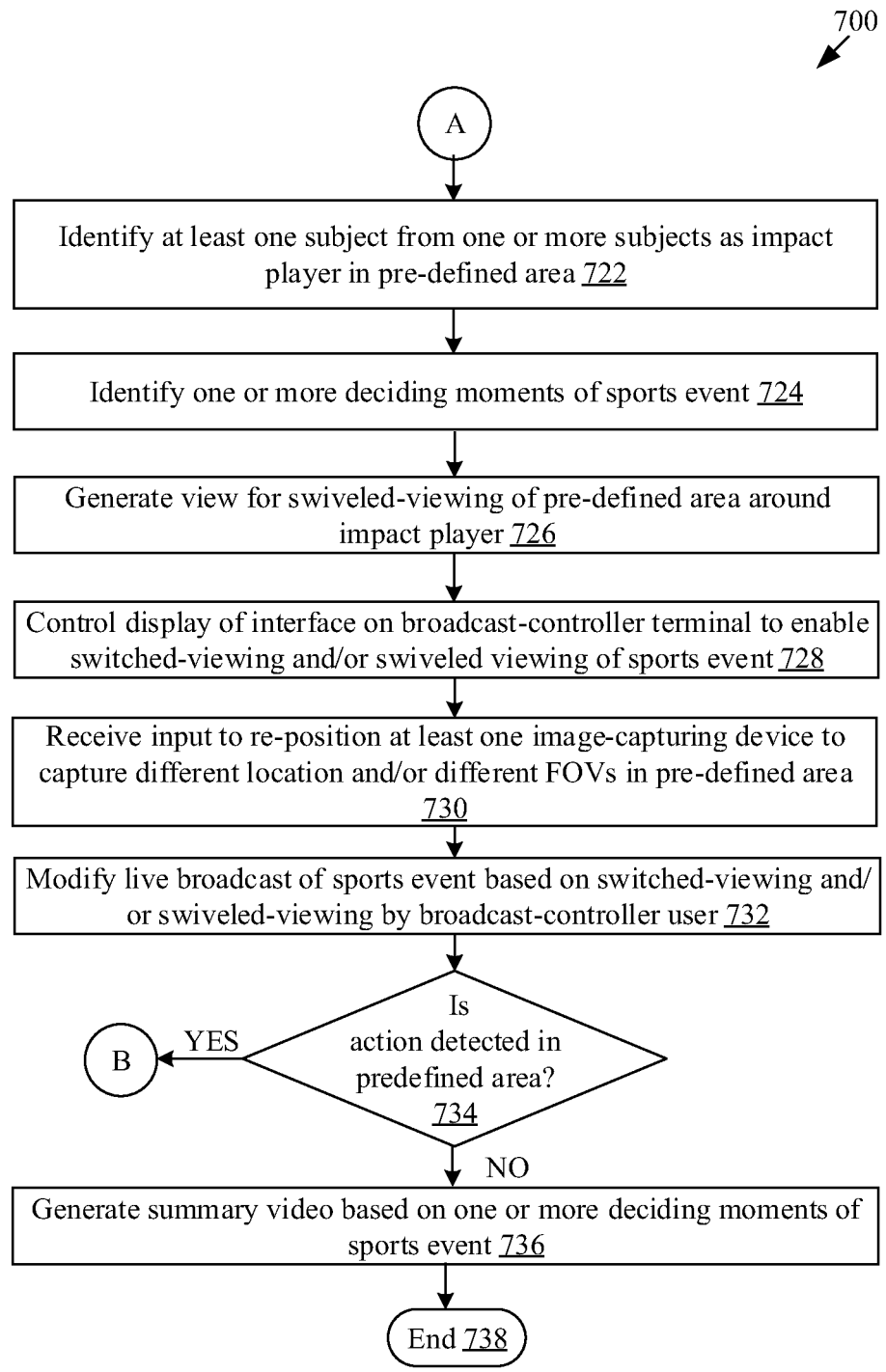

FIGS. 7A and 7B, depict, a flow chart that illustrates a method to generate one or more multi-dimensional videos, in accordance with an embodiment of the disclosure. With reference to FIG. 7A, there is shown a flow chart 700. The flow chart 700 is described in conjunction with FIGS. 1, 2, 3, 4, 5, and 6A to 6E. The method starts at step 702 and proceeds to step 704.

At step 704, a plurality of video feeds may be received from the plurality of image-capturing devices 108, which capture the pre-defined area 104. In accordance with an embodiment, the application server 120 may be configured to receive the plurality of video feeds from the plurality of image-capturing devices 108, via the first communication network 128. In accordance with an embodiment, a Li-Fi-based communication may be performed between the plurality of image-capturing devices 108 and the application server 120.

At step 706, sensor data may be received from a plurality of sensors. In accordance with an embodiment, the plurality of sensors may be associated with the one or more subjects 106 in the pre-defined area 104. For instance, the plurality of such sensors may correspond to the first set of sensors 110, which may be associated with respective subjects from the one or more subjects 106. Thus, the sensor data may correspond to the first sensor data, which may be received from the first set of sensors 110. However, as discussed above, the plurality of sensors may also include the second set of sensors 112 (associated with the sports equipment 116) and the third set of sensors 114 (placed at the predetermined locations in the pre-defined area 104). In accordance with an embodiment, the application server 120 may be configured to receive at least the first sensor data from the first set of sensors 110. In addition, the application server 120 may also receive the second sensor data from the second set of sensors 112, and the third sensor data from the third set of sensors 114.

At step 708, a current activity-of-interest may be tracked in the pre-defined area 104, based on the received plurality of video feeds and/or the received sensor data. In accordance with an embodiment, the application server 120 may be configured to track the current activity-of-interest based on image-processing techniques.

At step 710, an upcoming activity-of-interest in the pre-defined area 104 may be predicted. In accordance with an embodiment, the application server 120 may be configured to predict the upcoming activity-of-interest based on the plurality of video feeds, the received sensor data, and pre-stored statistical data of historical performance of the one or more subjects 106. The application server 120 may extract the pre-stored statistical data that may be extracted from the database server 118, prior to the prediction of the upcoming activity-of-interest. In accordance with an embodiment, a machine learning technique may be applied on the received sensor data and/or the pre-stored statistical data. In addition, one or more image processing techniques may be applied on the received plurality of video feeds, for the prediction of the upcoming activity-of-interest. An example of the pre-stored statistical data, such as the past statistical data 502 of two soccer teams, is shown in the FIG. 5.

At step 712, a location-of-occurrence of the upcoming activity-of-interest may be predicted. In accordance with an embodiment, the application server 120 may be configured to predict the location-of-occurrence of the upcoming activity-of-interest based on the plurality of video feeds, the received sensor data, and pre-stored statistical data of historical performance of the one or more subjects 106. An example of the predicted location-of-occurrence, such as the predicted location-of-occurrence 514, is shown in the FIG. 5.

At step 714, one or more control instructions are communicated to one or more of the plurality of image-capturing devices 108 to focus on the predicted location-of-occurrence. In accordance with an embodiment, the application server 120 may be configured to send the one or more control instructions to re-position the one or more image-capturing devices of the plurality of image-capturing devices 108 to enable focus towards the predicted location-of-occurrence before and/or during the occurrence of the predicted activity-of-interest. In accordance with an embodiment, the application server 120 may control capture of a video of the activity-of-interest by the one or more image-capturing devices. The video may be captured from a plurality of FOVs around the predicted location-of-occurrence before and/or during the occurrence of the activity-of-interest, based on the communicated one or more control instructions. The capture of the video may enable generation of a multi-dimensional video of the activity-of-interest by the application server 120.

At step 716, a first set of video feeds are received from the re-positioned one or more image-capturing devices. In accordance with an embodiment, the one or more image-capturing devices may capture a video of the activity-of-interest as the first set of video feeds. The application server 120 may receive the first set of video feeds from the one or more image-capturing devices.

At step 718, the first set of video feeds may be stitched together to generate a multi-dimensional video. In accordance with an embodiment, the application server 120 may be configured to generate the multi-dimensional video, based on stitching-together of the first set of video feeds received from the re-positioned one or more image-capturing devices, such as the cameras C1 to C4 as shown in FIG.

5. The first set of video feeds may correspond to the capture of the predicted activity-of-interest from the plurality of FOVs before and/or during the occurrence of the activity-of-interest.

At step 720, one or more views of the pre-defined area 104 of the sports event may be generated. In accordance with an embodiment, the application server 120 may be configured to generate the one or more views based on the received plurality of video feeds, the received sensor data, and/or the stitching of the first set of video feeds. The one or more views may include the normal view, the slow-motion view, the augmented reality view, and the 4D view of the sports event. In accordance with an embodiment, the 4D view may correspond to a 3D view around the location-of-occurrence captured from a plurality of FOVs by the one or more image-capturing devices in real-time or near real-time. Examples of the one or more views is shown in the FIG. 6A to 6E.

At step 722, at least one subject from the one or more subjects 106 may be identified as an impact player in the pre-defined area 104. In accordance with an embodiment, the application server 120 may be configured to identify the at least one subject as the impact player, based on the pre-stored statistical data, a current performance data, and/or the received sensor data. Further, the application server 120 may perform facial recognition to validate the identity of the impact player.

At step 724, one or more deciding moments of the sports event may be identified. In accordance with an embodiment, the application server 120 may be configured to identify the one or more deciding moments of the sports event, based at least on the prediction of the location-of-occurrence of the upcoming activity-of-interest, the received plurality of video feeds and/or the received sensor data. In accordance with an embodiment, the application server 120 may identify the occurrence of an activity-of-interest as a deciding moment when the activity-of-interest involves one of the identified impact players. Alternatively, if the activity-of-interest occurs in a predetermined vicinity of a particular location (such as near a goal post or corner in the case of football) in the pre-defined area 104, the application server 120 may identify a portion of video feed associated with that activity-of-interest as a deciding moment. A person skilled in the art may understand that step 724 may be performed at any position in the flowchart after step 710, without departure from the scope of the disclosure.

At step 726, a view for swiveled-viewing of the pre-defined area 104 around the impact player may be generated. In accordance with an embodiment, the application server 120 may be configured to generate the view associated with the swiveled-viewing around the impact player, based on a stitching of the first set of video feeds in real time, based on one or more FOVs of video feed captured around the location of the impact player. Step 720 may be performed in parallel to or after the series of steps 722 to 726, without departure from the scope of the disclosure.

At step 728, a display of the interface on the broadcast-controller terminal 122 may be controlled to enable a switched-viewing of the generated one or more views (at the step 720) and/or a swiveled-viewing of the pre-defined area 104 around the impact player. In accordance with an embodiment, the application server 120 may be configured to display the various views associated with switched-viewing and/or the swiveled-viewing of the pre-defined area 104 of sports event, via the interface of the broadcast-controller terminal 122. The broadcast-controller user 124 may view one of the multiple views presented via the interface to select a view for current live broadcast to the plurality of subscriber terminals (such as the subscriber terminal 132).

At step 730, an input may be received from the broadcast-controller terminal 122 to re-position at least one of the plurality of image-capturing devices 108. In accordance with an embodiment, the application server 120 and/or the broadcast-controller terminal 122 may be configured to re-position the at least one image-capturing device, to capture a different FOV and/or a different location in the pre-defined area 104. This location may be captured based on and/or during the switched-viewing and/or the swiveled-viewing of the sports event on the broadcast-controller terminal 122, or as per input provided by the broadcast-controller user 124.

At step 732, a live broadcast feed of the pre-defined area 104 of the sports event for the plurality of subscriber terminals (such as the subscriber terminal 132) may be modified, based on the switched-viewing and/or the swiveled-viewing of the sports event. In accordance with an embodiment, the application server 120 and/or the broadcast-controller terminal 122 may be configured to modify the live broadcast feed of the sports event, in accordance with the switched-viewing and/or the swiveled-viewing of the sports event on the broadcast-controller terminal 122. Thereafter, the broadcast apparatus 126 may be configured to broadcast the modified live feed of the sports event to the plurality of subscriber-terminals (such as the subscriber terminal 132), via the second communication network 130. The step 730 may be performed in parallel to or after step 732 without departure from the scope of the disclosure. Further, control from step 730 and step 732 may merge to step 734.

At step 734, a check may be performed to determine whether an action associated with the sports event is still in progress in the pre-defined area 104. The application server 120 may be configured to perform the check, based on the plurality of received video feeds and/or the sensor data. Based on the result of the check, the application server 120 may be configured to repeat the method steps from steps 704 to 734, when action associated with the sports event is determined to be still in progress. If the sports event has ended, the control passes to step 736.

At step 736, a summary video may be generated based on the identified one or more deciding moments. In accordance with an embodiment, the application server 120, and/or the broadcast-controller terminal 122, may generate the summary video, based on the one or more deciding moments. In accordance with an embodiment, the broadcast apparatus 126 may be configured to broadcast the summary video as a highlight of the sports event to the plurality of subscriber terminals (such as the subscriber terminal 132). A person skilled in the art may understand that the step 736 may be performed along with and/or at any position in the flowchart 700 after the step 724. Control passes to end step 738.

In accordance with an embodiment of the disclosure, a system to generate one or more multi-dimensional videos is disclosed. The system (such as the application server 120 (FIG. 1) may comprise one or more circuits (hereinafter referred to as the first processor 202 (FIG. 2)). The first processor 202 may be configured to receive a plurality of video feeds from the plurality of image-capturing devices 108 that capture the pre-defined area 104. The first processor 202 may be further configured to receive sensor data from a plurality of sensors associated with one or more subjects in the pre-defined area 104. The first processor 202 may be further configured to predict a location-of-occurrence of an upcoming activity-of-interest in the pre-defined area 104, based on the received plurality of video feeds, the received sensor data, and/or pre-stored statistical data of historical performance of the one or more subjects. The first processor 202 may be further configured to communicate one or more control instructions to one or more of the plurality of image-capturing devices 108 to focus towards the predicted location-of-occurrence to enable generation of a multi-dimensional video of the upcoming activity-of-interest.

Various embodiments of the disclosure may provide a non-transitory computer readable medium and/or storage medium having stored thereon, a set of instructions executable by a machine and/or a computer to generate one or more multi-dimensional videos. The at least one code section may cause the machine and/or computer to perform the steps that comprise the reception of a plurality of videos feeds from the plurality of image-capturing devices 108 that may capture a pre-defined area 104. Sensor data may be received from a plurality of sensors associated with one or more subjects in the pre-defined area 104. Thereafter, a location-of-occurrence of an upcoming activity-of-interest may be predicted in the pre-defined area 104, based on the received plurality of video feeds, the sensor data, and/or pre-stored statistical data of the historical performance of the one or more subjects. Further, one or more control instructions may be communicated to one or more of the plurality of image-capturing devices 108 to focus towards the predicted location-of-occurrence to enable the generation of the multi-dimensional video of the upcoming activity-of-interest.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. A system, comprising:
   circuitry configured to:
   receive a plurality of video feeds from a plurality of image-capturing devices, wherein said plurality of image-capturing devices captures a specific area;
   receive sensor data from a plurality of sensors associated with at least one subject in said specific area;
   store statistical data of historical performance of said at least one subject;
   predict a location-of-occurrence of an upcoming activity-of-interest in a sports event in said specific area, based on said received plurality of video feeds, said received sensor data, and said stored statistical data of said historical performance of said at least one subject, wherein
      said predicted location-of-occurrence corresponds to a first location of occurrence of said upcoming activity-of-interest in said specific area, and
      said stored statistical data comprises an action heat-map of said at least one subject in a plurality of previously held sports events;
   communicate at least one control instruction to at least two image-capturing devices of said plurality of image-capturing devices;
   control, based on said at least one control instruction, said at least two image-capturing devices to focus towards said predicted location-of-occurrence;
   generate, based on said control of said at least two image-capturing devices, a normal view, a slow-motion view, an augmented-reality view, and a four-dimensional (4D) view of said upcoming activity-of-interest;
   communicate each of said normal view, said slow-motion view, said augmented-reality view, and said 4D view to a broadcast controller terminal; and
   control display of an interface on said broadcast controller terminal to concurrently display said normal view, said slow-motion view, said augmented-reality view, and said 4D view, wherein
      said interface includes a first region, a second region, a third region, and a fourth region,
      said normal view is displayed on said first region,
      said slow-motion view is displayed on said second region,
      said augmented-reality view is displayed on said third region, and
      said 4D view is displayed on said fourth region.

2. The system of claim 1, wherein said stored statistical data further comprises at least one of:
   a dominant foot-action of said at least one subject,
   a dominant arm-action of said at least one subject,
   a body-motion profile of said at least one subject,
   a game-play of said at least one subject in said plurality of previously held sports events, or
   a game-strategy of a team associated with said at least one subject in said plurality of previously held sports events.

3. The system of claim 1, wherein
   said sensor data corresponds to at least one of a wearable device, a sensor in an equipment in said sports event, or a sensor in said specific area, and
   said plurality of sensors includes said sensor in said equipment and said sensor in said specific area.

4. The system of claim 1, wherein said circuitry is further configured to predict said upcoming activity-of-interest based on at least one of said received plurality of video feeds, said received sensor data, or said stored statistical data.

5. The system of claim 1, wherein said circuitry is further configured to predict said location-of-occurrence, of said upcoming activity-of-interest, based on at least one of:
a machine learning technique applied on at least one of said received sensor data or said stored statistical data, or
at least one image processing technique applied on said received plurality of video feeds.

6. The system of claim 1, wherein said circuitry is further configured to track a current activity-of-interest in said specific area based on at least one of said received plurality of video feeds or said received sensor data.

7. The system of claim 1, wherein
said circuitry is further configured to control capture of a video of said upcoming activity-of-interest by each of said plurality of image-capturing devices,
said video of said upcoming activity-of-interest is captured from a plurality of field-of-views around said predicted location-of-occurrence,
said video is captured at a time period which is one of before or concurrent with occurrence of said upcoming activity-of-interest, and
said video of said upcoming activity-of-interest is captured based on said communicated at least one control instruction.

8. The system of claim 7, wherein said circuitry is further configured to:
receive a set of video feeds from said plurality of image-capturing devices; and
stitch said set of video feeds for a generation of a multi-dimensional video, wherein said set of video feeds corresponds to said video, of said upcoming activity-of-interest, captured from said plurality of field-of-views.

9. The system of claim 7, wherein said circuitry is further configured to:
receive a set of video feeds from said plurality of image-capturing devices;
stitch said set of video feeds received from said plurality of image-capturing devices; and
generate said 4D view of said upcoming activity-of-interest based on said stitched set of video feeds, wherein said 4D view corresponds to a multi-dimensional video.

10. The system of claim 9, wherein said circuitry is further configured to generate said normal view, said slow-motion view, said augmented-reality view, and said 4D view of said sports event, in one of real-time or near-real time, based on at least one of said received plurality of video feeds, said received sensor data, or said stitched set of video feeds.

11. The system of claim 10, wherein
said 4D view corresponds to a three-dimensional (3D) view of said predicted location-of-occurrence, and
said predicted location-of-occurrence is captured from said plurality of field-of-views at different time instances.

12. The system of claim 10, wherein
said circuitry is further configured to communicate, via a Light-Fidelity (Li-Fi) based communication, each of said normal view, said slow-motion view, said augmented-reality view, and said 4D view to said broadcast controller terminal in said one of real-time or near-real time, and said broadcast controller terminal is associated with said sports event.

13. The system of claim 12, wherein said circuitry is further configured to
switch among said normal view, said slow-motion view, said augmented-reality view, and said 4D view, based on said control of said display of said interface.

14. The system of claim 1, wherein
said circuitry is further configured to identify a subject as an impact player,
said subject is identified from said at least one subject in said specific area associated with said sports event, and
said subject is identified as said impact player based on at least one of said stored statistical data, a current performance of said at least one subject in said sports event, or said received sensor data.

15. The system of claim 14, wherein said circuitry is further configured to:
receive a set of video feeds from said plurality of image-capturing devices;
stitch said set of video feeds in one of real-time or near-real time;
control said display of said interface on said broadcast controller terminal based on said stitched set of video feeds; and
enable, on said broadcast controller terminal, swiveled-view of said sports event based on said control of said display of said interface on said broadcast controller terminal, wherein said swiveled-view is around said impact player.

16. The system of claim 1, wherein said circuitry is further configured to identify at least one deciding moment of said sports event based on at least one of said prediction of said location-of-occurrence of said upcoming activity-of-interest, said received plurality of video feeds, or said received sensor data.

17. The system of claim 16, wherein said circuitry is further configured to:
generate a summary video based on said identified at least one deciding moment; and
broadcast said generated summary video to a plurality of subscriber-terminals as a highlight video of said sports event.

18. The system of claim 1, wherein
said circuitry is further configured to reposition at least one of said plurality of image-capturing devices to capture one of a first field-of-view in said specific area or a second location in said specific area, and
said one of said first field-of-view or said second location is captured based on at least one of a switched-view or a swiveled-view of said sports event on said broadcast controller terminal.

19. The system of claim 18, wherein said circuitry is further configured to modify, with said interface displayed on said broadcast controller terminal, a live broadcast feed of said sports event for a plurality of subscriber-terminals, in one of real-time or near-real time, based on said at least one of said switched-view or said swiveled-view of said sports event.

20. The system of claim 1, wherein
said circuitry is further configured to broadcast a multi-dimensional video with at least one view of said sports event, in one of real-time or near-real time, to a plurality of subscriber-terminals, and
said multi-dimensional video is broadcasted via at least one of Internet, a Satellite-television (TV) infrastructure, or a Cable-TV infrastructure.

21. The system of claim 1, wherein said circuitry is further configured to:
calculate a difference between a current field-of-view of each image-capturing device of said plurality of image-capturing devices and a specific field-of-view, wherein said specific field-of-view corresponds to said predicted location-of-occurrence; and
select said at least two image-capturing devices from said plurality of image-capturing devices based on said calculated difference, wherein
said selected at least two image-capturing devices capture said predicted location-of-occurrence, and
said selected at least two image-capturing devices are closest to said predicted location-of-occurrence among said plurality of image-capturing devices.

22. The system of claim 1, wherein a field-of view of a first image-capturing device of said plurality of image-capturing devices overlaps with a field-of-view of a second image-capturing device of said plurality of image-capturing devices.

23. A method, comprising:
receiving, by circuitry in a server, a plurality of video feeds from a plurality of image-capturing devices, wherein said plurality of image-capturing devices captures a specific area;
receiving, by said circuitry, sensor data from a plurality of sensors associated with at least one subject in said specific area;
storing, by said circuitry, statistical data of historical performance of said at least one subject;
predicting, by said circuitry, a location-of-occurrence of an upcoming activity-of-interest in a sports event in said specific area, based on said received plurality of video feeds, said received sensor data, and said stored statistical data of said historical performance of said at least one subject, wherein
said predicted location-of-occurrence corresponds to a specific location of occurrence of said upcoming activity-of-interest in said specific area, and
said stored statistical data comprises an action heat-map of said at least one subject in a plurality of previously held sports events;
communicating, by said circuitry, at least one control instruction to at least two image-capturing devices of said plurality of image-capturing devices;
controlling, by said circuitry, based on said at least one control instruction, said at least two image-capturing devices to focus towards said predicted location-of-occurrence;
generating, by said circuitry, based on said control of said at least two image-capturing devices, a normal view, a slow-motion view, an augmented-reality view, and a four-dimensional (4D) view of said upcoming activity-of-interest;
communicating, by said circuitry, each of said normal view, said slow-motion view, said augmented-reality view, and said 4D view to a broadcast controller terminal; and
controlling, by said circuitry, display of an interface on said broadcast controller terminal to concurrently display said normal view, said slow-motion view, said augmented-reality view, and said 4D view, wherein
said interface includes a first region, a second region, a third region, and a fourth region,
said normal view is displayed on said first region,
said slow-motion view is displayed on said second region,
said augmented-reality view is displayed on said third region, and
said 4D view is displayed on said fourth region.

* * * * *